US009488541B2

(12) United States Patent
Fukuzawa et al.

(10) Patent No.: US 9,488,541 B2
(45) Date of Patent: Nov. 8, 2016

(54) PRESSURE SENSOR, MICROPHONE, AND ACOUSTIC PROCESSING SYSTEM

(71) Applicant: Kabushiki Kaisha Toshiba, Minato-ku (JP)

(72) Inventors: Hideaki Fukuzawa, Kawasaki (JP); Masatoshi Sakurai, Nerima (JP); Masayuki Kii, Yokohama (JP); Yoshihiko Fuji, Kawasaki (JP); Michiko Hara, Yokohama (JP); Yoshihiro Higashi, Komatsu (JP); Kenji Otsu, Fuchu (JP); Akiko Yuzawa, Kawasaki (JP); Kazuaki Okamoto, Fuchu (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 35 days.

(21) Appl. No.: 14/584,476

(22) Filed: Dec. 29, 2014

(65) Prior Publication Data

US 2015/0271586 A1 Sep. 24, 2015

(30) Foreign Application Priority Data

Mar. 20, 2014 (JP) .................. 2014-058938

(51) Int. Cl.
*H04R 5/02* (2006.01)
*G01L 9/00* (2006.01)
*H04R 19/04* (2006.01)
(Continued)

(52) U.S. Cl.
CPC .............. *G01L 9/0051* (2013.01); *G01L 9/16* (2013.01); *H04R 19/04* (2013.01); *H04R 19/005* (2013.01)

(58) Field of Classification Search
CPC ................................. H04R 5/02; H04S 7/301
See application file for complete search history.

(56) References Cited

U.S. PATENT DOCUMENTS

| 7,119,560 B2 * | 10/2006 | Nihei ................. G01R 31/2891 324/750.19 |
| 2004/0238821 A1 | 12/2004 | Yang |
| 2008/0205668 A1 | 8/2008 | Torii et al. |
| 2009/0230487 A1 * | 9/2009 | Saitoh ................... B81B 7/0061 257/419 |

(Continued)

FOREIGN PATENT DOCUMENTS

| JP | 2008-245267 | 10/2008 |
| JP | 2013-205403 | 10/2013 |

(Continued)

OTHER PUBLICATIONS

Combined Taiwanese Office Action and Search Report issued Dec. 22, 2015 in Patent Application No. 103146126 (with English language translation).

(Continued)

*Primary Examiner* — Simon King
(74) *Attorney, Agent, or Firm* — Oblon, McClelland, Maier & Neustadt, L.L.P.

(57) ABSTRACT

According to one embodiment, a pressure sensor includes: a base body; a sensor section; and a processing circuit. The sensor section includes: a transducing thin film; a first strain sensing element; and a second strain sensing element. The transducing thin film has a film surface and is flexible. The processing circuit is configured to output as an output signal at least one of a first signal obtained from the first strain sensing element upon application of external pressure to the transducing thin film and a second signal obtained from the second strain sensing element upon application of the external pressure to the transducing thin film.

18 Claims, 25 Drawing Sheets

(51) Int. Cl.
*G01L 9/16* (2006.01)
*H04R 19/00* (2006.01)

(56) References Cited

U.S. PATENT DOCUMENTS

| | | |
|---|---|---|
| 2011/0005325 A1 | 1/2011 | Yang et al. |
| 2011/0158284 A1* | 6/2011 | Goto .................... A61B 5/0008 374/163 |
| 2013/0214776 A1* | 8/2013 | Holman ............... G01R 33/098 324/252 |
| 2013/0255393 A1 | 10/2013 | Fukuzawa et al. |
| 2013/0346018 A1* | 12/2013 | Akada ................. G01P 13/0006 702/150 |

FOREIGN PATENT DOCUMENTS

| | | |
|---|---|---|
| JP | 2013-251774 | 12/2013 |
| TW | I224191 B | 11/2004 |
| TW | 200426354 A | 12/2004 |
| TW | 201102632 A1 | 1/2011 |
| WO | WO 2013/179990 A1 | 12/2013 |

OTHER PUBLICATIONS

Takashi Kasai et al. "Novel Concept for a MEMS Microphone With Dual Channels for an Ultrawide Dynamic Range", MEMS, 2011, 4 pages.

* cited by examiner

PRESSURE SENSOR, MICROPHONE, AND ACOUSTIC PROCESSING SYSTEM

CROSS-REFERENCE TO RELATED APPLICATIONS

This application is based upon and claims the benefit of priority from Japanese Patent Application No. 2014-058938, filed on Mar. 20, 2014; the entire contents of which are incorporated herein by reference.

FIELD

Embodiments described herein relate generally to a pressure sensor, a microphone, and an acoustic processing system.

BACKGROUND

In a capacitive microphone, a sound is converted into an electrical signal by the change of capacitance. In the capacitive microphone, the entirety of the diaphragm constitutes part of the electrode. Thus, downsizing the microphone results in also decreasing the area of the electrode along with the diaphragm. This degrades the sensitivity. On the other hand, the sensitivity is improved by decreasing the gap of the capacitor. However, if the gap of the capacitor is decreased, the gap of the capacitor may be insufficient for high sound volume, and sticking may occur. Sticking is a phenomenon in which the diaphragm remains stuck to the electrode. Furthermore, the capacitive microphone may be designed for high sound volume by including a plurality of diaphragms. However, switching of the diaphragms may be difficult for high frequency sound.

DETAILED DESCRIPTION

Figure 1:
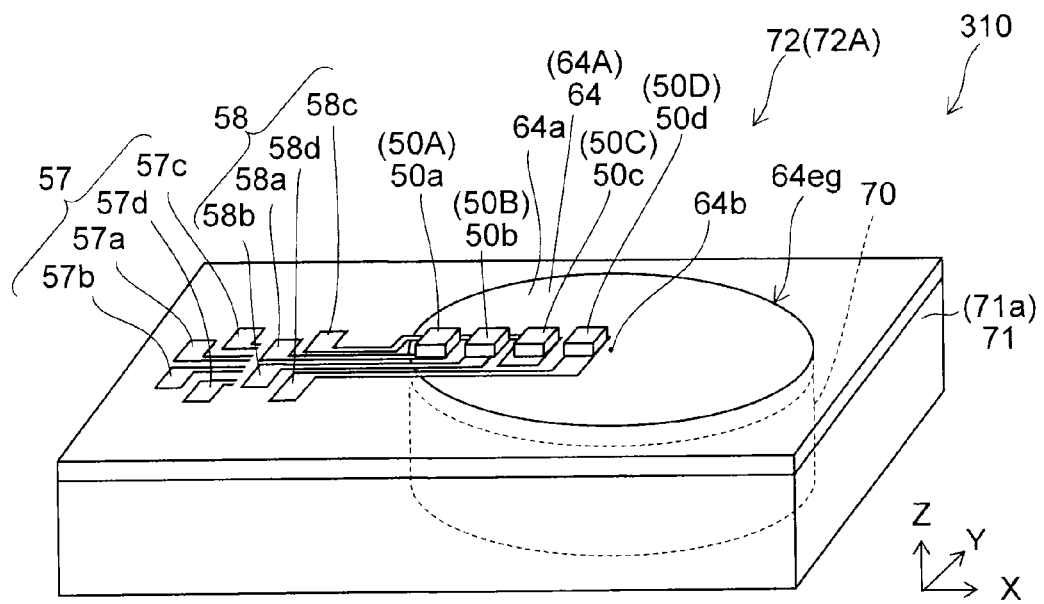
FIG. 1 is a schematic perspective view illustrating the configuration of a pressure sensor according to a first embodiment.

In general, according to one embodiment, a pressure sensor includes: a base body; a sensor section; and a processing circuit. The sensor section is provided on the base body. The processing circuit is configured to process a signal obtained from the sensor section. The sensor section includes: a transducing thin film; a first strain sensing element; and a second strain sensing element. The transducing thin film has a film surface and is flexible. The first strain sensing element is provided on the film surface at a position being different from barycenter of the film surface. The second strain sensing element is provided on the film surface at a position spaced from the first strain sensing element and being different from the barycenter. The processing circuit is configured to output as an output signal at least one of a first signal obtained from the first strain sensing element upon application of external pressure to the transducing thin film and a second signal obtained from the second strain sensing element upon application of the external pressure to the transducing thin film.

Embodiments will now be described with reference to the drawings.

The drawings are schematic or conceptual. The size ratio between the portions, for instance, is not necessarily identical to those in reality. Furthermore, the same portion may be shown with different dimensions or ratios depending on the figures.

In this specification and the drawings, components similar to those described previously with reference to earlier figures are labeled with like reference numerals, and the detailed description thereof is omitted appropriately.

(First Embodiment)

FIG. 1 is a schematic perspective view illustrating the configuration of a pressure sensor according to a first embodiment.

In FIG. 1, for clarity of illustration, insulating portions are not shown, and conductive portions are primarily depicted.

Figure 2:
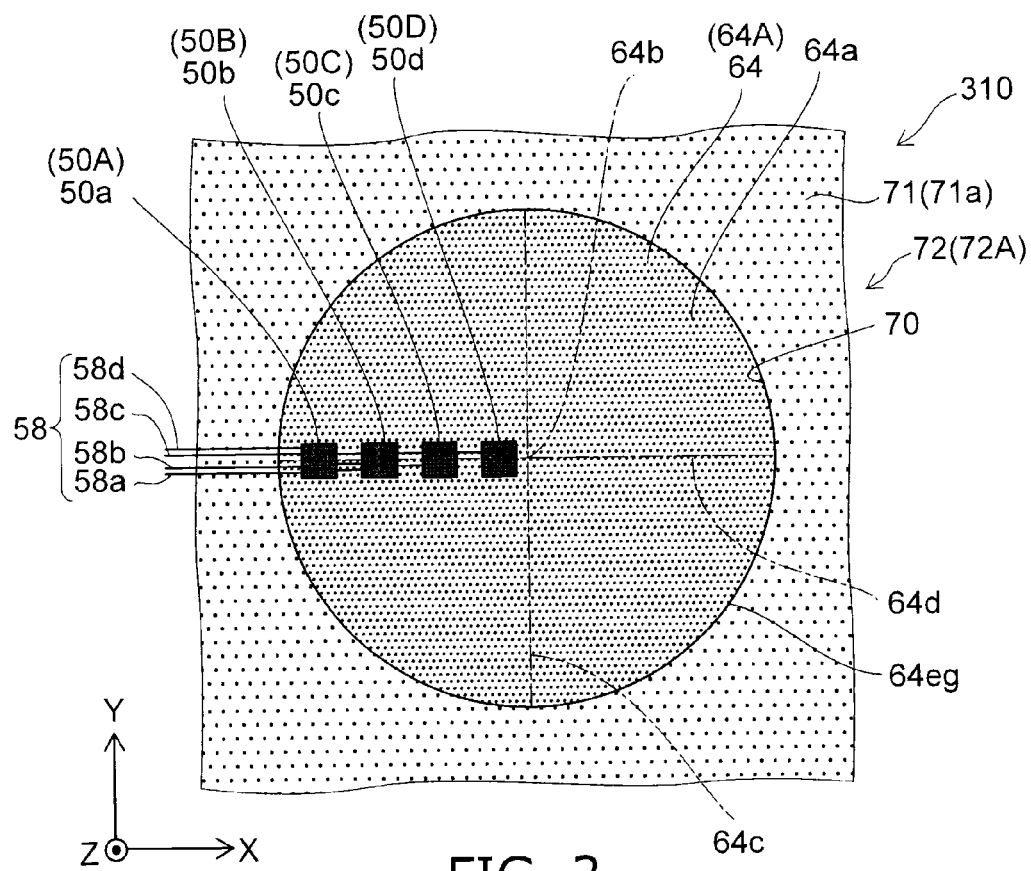
FIG. 2 is a schematic plan view illustrating the configuration of part of the pressure sensor according to the first embodiment.
Figure 3A:
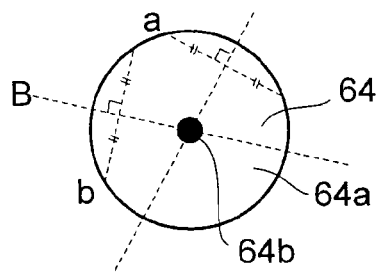
FIGS. 3A to 3D are schematic plan views illustrating the configuration of part of the pressure sensor according to the first embodiment.
Figure 3B:
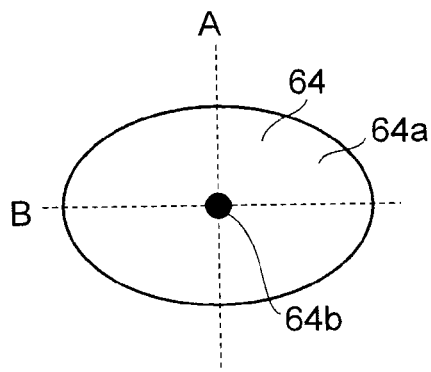
Figure 3C:
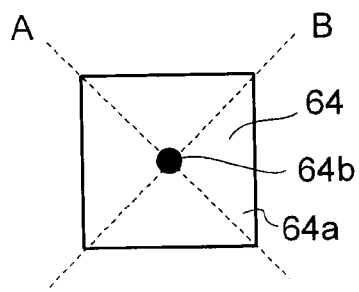
Figure 3D:
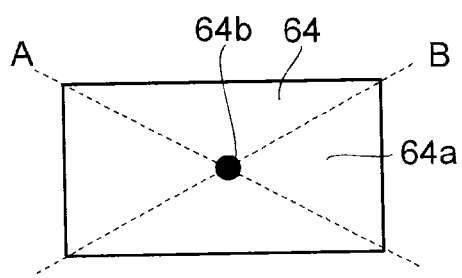

FIG. 2 is a schematic plan view illustrating the configuration of part of the pressure sensor according to the first embodiment.

As shown in FIG. 1, the pressure sensor 310 according to this embodiment includes a base body 71a and a sensor section 72 (first sensor section 72A). The sensor section 72 is provided on the base body 71a. The sensor section 72 (first sensor section 72A) includes a first transducing thin film 64A and a first strain sensing element 50A. The first transducing thin film 64A has a film surface 64a (first film surface). The first transducing thin film 64A is flexible. The first transducing thin film 64A warps upon application of external pressure and has the function of transducing the pressure into a strain to be sensed by the strain sensing element 50 formed thereon. The external pressure includes the pressure itself as well as a pressure caused by e.g. sound waves or ultrasonic waves. In the case of e.g. sound waves or ultrasonic waves, the pressure sensor functions as a microphone.

The thin film constituting the transducing thin film 64 may be formed continuously outside the portion warped by external pressure. In this specification, the transducing thin film is defined as a portion surrounded with a fixed end, having a fixed film thickness thinner than the fixed end, and configured to warp by external pressure.

The first transducing thin film 64A is fixed to the base body 71a at the edge part 64eg. The first strain sensing element 50A is provided on the first film surface. The configuration of the first strain sensing element 50A will be described later.

A cavity section 70 is formed in the base body 71a. The portion of the base body 71a other than the cavity section 70 corresponds to a non-cavity section 71. The non-cavity section 71 is juxtaposed with the cavity section 70.

The cavity section 70 is a portion in which the material forming the non-cavity section 71 is not provided. The inside of the cavity section 70 may be a vacuum (a low-pressure state lower than 1 atmosphere). Alternatively, the cavity section 70 may be filled with a gas such as air and inert gas. Alternatively, the cavity section 70 may be filled with liquid. A deformable substance may be placed in the cavity section 70 so that the first transducing thin film 64A can warp.

When a pressure (including e.g. sound and ultrasonic wave) is externally applied to the first transducing thin film 64A, the first transducing thin film 64A warps. Accordingly, a strain occurs in the strain sensor (sensor section 72) placed on the first transducing thin film 64A. Thus, the first transducing thin film 64A transfers (transduces) a pressure signal to the sensor section 72. The pressure signal is converted into a strain signal in the sensor section 72.

The first transducing thin film 64A is placed above the cavity section 70 and fixed to the base body 71a at the edge part 64eg.

Here, the plane parallel to the film surface 64a (first film surface) is referred to as X-Y plane. In the case where the film surface 64a is not a plane, the plane including the edge part 64eg of the film surface 64a is referred to as X-Y plane. The direction perpendicular to the X-Y plane is referred to as Z-axis direction.

As shown in FIGS. 1 and 2, the pressure sensor 310 includes a base body 71a, a transducing thin film 64 (first transducing thin film 64A), a first strain sensing element 50A, a first wiring 57 (wirings 57a-57d), and a second wiring 58 (wirings 58a-58d). In this example, a plurality of strain sensing elements 50 (strain sensing elements 50a-50d) are provided. The first strain sensing element 50A is one of the plurality of strain sensing elements 50. For instance, the first strain sensing element 50A is the strain sensing element 50a.

More specifically, the sensor section 72 (first sensor section 72A) further includes a second strain sensing element 50B. The second strain sensing element 50B is provided on the film surface 64a. The second strain sensing element 50B is e.g. the strain sensing element 50b. In this example, the straight line passing through the first strain sensing element 50A and the second strain sensing element 50B passes through the barycenter 64b of the film surface 64a. Specifically, the straight line passing through the barycenter of the first strain sensing element 50A and the barycenter of the second strain sensing element 50B passes through the barycenter 64b. The distance between the first strain sensing element 50A and the barycenter 64b of the film surface 64a is different from the distance between the second strain sensing element 50B and the barycenter 64b of the film surface 64a.

The sensor section 72 further includes a third strain sensing element 50C. The third strain sensing element 50C is provided on the film surface 64a. The third strain sensing element 50C is e.g. the strain sensing element 50c. In this example, the straight line passing through the first strain sensing element 50A, the second strain sensing element 50B, and the third strain sensing element 50C passes through the barycenter 64b of the film surface 64a. Specifically, the straight line passing through the barycenter of the first strain sensing element 50A, the barycenter of the second strain sensing element 50B, and the barycenter of the third strain sensing element 50C passes through the barycenter 64b. The distance between the third strain sensing element 50C and the barycenter 64b of the film surface 64a is different from the distance between the first strain sensing element 50A and the barycenter 64b of the film surface 64a and the distance between the second strain sensing element 50B and the barycenter 64b of the film surface 64a.

The sensor section 72 further includes a fourth strain sensing element 50D. The fourth strain sensing element 50D is provided on the film surface 64a. The fourth strain sensing element 50D is e.g. the strain sensing element 50d. In this example, the straight line passing through the first strain sensing element 50A, the second strain sensing element 50B, the third strain sensing element 50C, and the fourth strain sensing element 50D passes through the barycenter 64b of the film surface 64a. Specifically, the straight line passing through the barycenter of the first strain sensing element 50A, the barycenter of the second strain sensing element 50B, the barycenter of the third strain sensing element 50C, and the barycenter of the fourth strain sensing element 50D passes through the barycenter 64b. The distance between the fourth strain sensing element 50D and the barycenter 64b of the film surface 64a is different from the distance between the first strain sensing element 50A and the barycenter 64b of the film surface 64a, the distance between the second strain sensing element 50B and the barycenter 64b of the film surface 64a, and the distance between the third strain sensing element 50C and the barycenter 64b of the film surface 64a.

In this example, four strain sensing elements 50 (strain sensing elements 50a-50d) are provided. The strain sensing elements 50a-50d are placed on the film surface 64a along the portion of the straight line 64d on the −X-axis direction side of the center (corresponding to the barycenter 64b). Furthermore, the strain sensing elements 50 are placed at positions different from the position of the barycenter 64b of the film surface 64a of the transducing thin film 64. The number of placed strain sensing elements 50 is not limited to four. The number of placed strain sensing elements 50 only needs to be a plurality. The number of placed strain sensing elements 50 may be two, three, or five or more.

FIGS. 3A to 3D are schematic plan views illustrating the configuration of part of the pressure sensor according to the first embodiment.

These figures illustrate the shape of the film surface 64a of the transducing thin film 64.

As shown in FIGS. 3A to 3D, the shape of the film surface 64a (warping portion) of the transducing thin film 64 is e.g. a circle, an oblong circle (including an ellipse), a square, or a rectangle. In such cases, the barycenter of the film surface 64a is equal to the center of the circle, the center of the ellipse, the center of the diagonal of the square, or the center of the diagonal of the rectangle.

The transducing thin film 64 is formed from e.g. an insulating layer. Alternatively, the transducing thin film 64 is formed from e.g. a metal material. The transducing thin film 64 includes e.g. silicon oxide or silicon nitride. The thickness of the transducing thin film 64 is e.g. 200 nm or more and 3 μm or less. Preferably, the thickness of the transducing thin film 64 is 300 nm or more and 1.5 μm or less. The diameter of the transducing thin film 64 is e.g. 1 μm or more and 600 μm or less. More preferably, the diameter of the transducing thin film 64 is 60 μm or more and 600 μm or less. The transducing thin film 64 is flexible in e.g. the Z-axis direction perpendicular to the film surface 64a.

As shown in FIG. 2, in this example, the straight line 64c passes through the barycenter 64b of the film surface 64a of the transducing thin film 64. The straight line 64c is parallel to the Y-axis direction. The straight line 64d passes through the barycenter 64b of the film surface 64a of the transducing thin film 64. The straight line 64d is parallel to the X-axis direction.

The transducing thin film 64 and the base body 71a may be made of the same material and formed integrally. In this case, the edge part of the portion having a thin thickness constitutes the edge part 64eg of the transducing thin film 64. The transducing thin film 64 may include a cavity section 70 penetrating through the base body 71a in the thickness direction, and cover the cavity section 70. In this case, in the film of the material constituting the transducing thin film 64, the edge part of the portion overlapping the cavity section 70 constitutes the edge part 64eg of the transducing thin film 64.

One end of each of the strain sensing elements 50a-50d is connected to one of the first wirings 57 (e.g., wirings 57a-57d). The other end of each of the strain sensing elements 50a-50d is connected to one of the second wirings 58 (e.g., wirings 58a-58d).

The first wirings 57 and the second wirings 58 pass through the edge part 64eg and extend from the strain sensing elements 50 toward the base body 71a.

Figure 4:
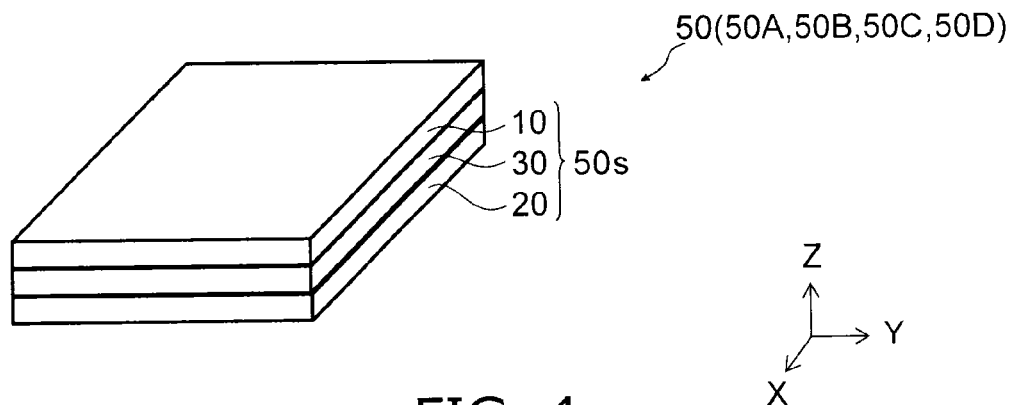
FIG. 4 is a schematic perspective view illustrating the configuration of part of the pressure sensor according to the first embodiment.

FIG. 4 is a schematic perspective view illustrating the configuration of part of the pressure sensor according to the first embodiment.

FIG. 4 shows an example configuration of the strain sensing element 50. As shown in FIG. 4, the strain resistance change section 50s (being the strain sensing element 50, such as the first strain sensing element 50A) includes e.g. a first magnetic layer 10, a second magnetic layer 20, and an intermediate layer 30 (first intermediate layer) provided between the first magnetic layer 10 and the second magnetic layer 20. The intermediate layer 30 is a nonmagnetic layer. The configuration of each of the plurality of strain sensing elements 50 is also similar to the foregoing.

In this example, the first magnetic layer 10 is a magnetization free layer. The second magnetic layer 20 is e.g. a magnetization fixed layer or magnetization free layer.

In the following, an example operation of the strain sensing element 50 is described with reference to the case where the second magnetic layer 20 is a magnetization fixed layer and the first magnetic layer 10 is a magnetization free layer. The strain sensing element 50 uses the "inverse magnetostriction effect" of a ferromagnetic body and the "MR effect" developed in the strain resistance change section 50s.

The "MR effect" is a phenomenon in a stacked film including a magnetic body. In the MR effect, upon application of an external magnetic field, the value of electrical resistance of the stacked film is changed by the change of magnetization of the magnetic body. The MR effect includes e.g. the GMR (giant magnetoresistance) effect or the TMR (tunneling magnetoresistance) effect. The change in the relative angle of the magnetization direction is read as an electrical resistance change by passing a current in the strain resistance change section 50s. This develops the MR effect. For instance, based on the stress applied to the strain sensing element 50, a tensile stress is applied to the strain resistance change section 50s. When the magnetization direction of the first magnetic layer 10 (magnetization free layer) is different from the direction of the tensile stress applied to the second magnetic layer 20, the MR effect is developed by the inverse magnetostriction effect. The resistance in the low resistance state is denoted by R. The amount of change of electrical resistance changed by the MR effect is denoted by ΔR. Then, ΔR/R is referred to as "MR change rate".

Figures 5A, 5B:
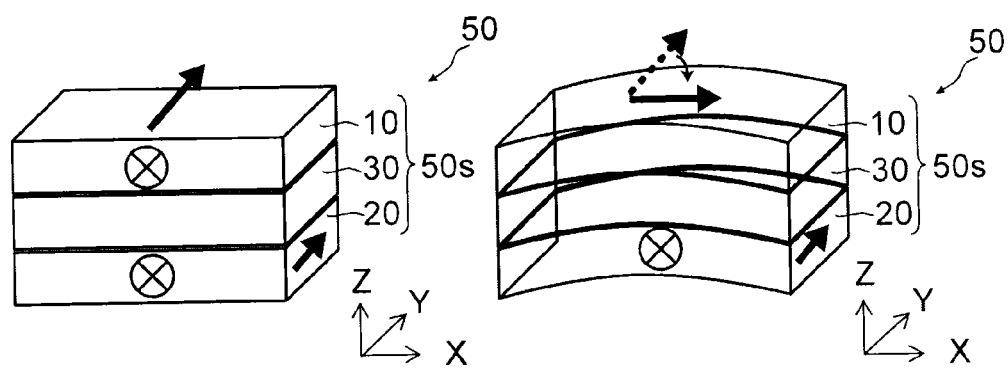
FIGS. 5A to 5C are schematic perspective views illustrating the operation of the pressure sensor according to the first embodiment.
Figure 5C:
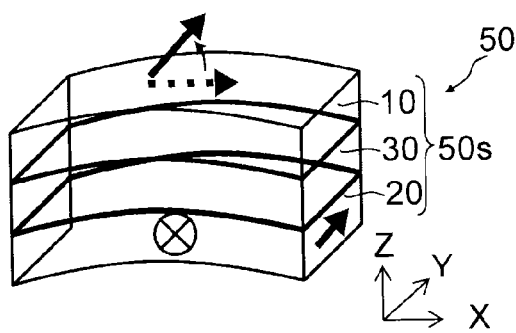

FIGS. 5A to 5C are schematic perspective views illustrating the operation of the pressure sensor according to the first embodiment.

These figures illustrate the state of the strain sensing element 50. These figures illustrate the relationship between the magnetization direction and the direction of the tensile stress in the strain sensing element 50.

FIG. 5A shows the state in which no tensile stress is applied. Here, in this example, the magnetization direction of the second magnetic layer 20 (magnetization fixed layer) is the same as the magnetization direction of the first magnetic layer 10 (magnetization free layer).

FIG. 5B shows the state in which a tensile stress is applied. In this example, a tensile stress is applied along the X-axis direction. For instance, a tensile stress along e.g. the X-axis direction is applied by the deformation of the transducing thin film 64. More specifically, the tensile stress is applied in the direction (Y-axis direction in this example) orthogonal to the magnetization direction of the second magnetic layer 20 (magnetization fixed layer) and the first magnetic layer 10 (magnetization free layer). Here, the magnetization of the first magnetic layer 10 (magnetization free layer) is rotated so as to be directed in the same direction as the tensile stress. This is referred to as "inverse magnetostriction effect". Here, the magnetization of the second magnetic layer 20 (magnetization fixed layer) is fixed. Thus, the relative angle between the magnetization direction of the second magnetic layer 20 (magnetization fixed layer) and the magnetization direction of the first magnetic layer 10 (magnetization free layer) is changed by the rotation of the magnetization of the first magnetic layer 10 (magnetization free layer).

This figure shows an example of the magnetization direction of the second magnetic layer 20 (magnetization fixed layer). The magnetization direction does not need to be the direction shown in this figure.

In the inverse magnetostriction effect, the magnetization easy axis changes with the sign of the magnetostriction constant of the ferromagnetic body. The magnetostriction constant has a positive sign in many materials exhibiting a significant inverse magnetostriction effect. In the case where the magnetostriction constant has a positive sign, the direction of application of the tensile stress is the magnetization easy axis as described above. In this case, as described above, the magnetization of the first magnetic layer 10 (magnetization free layer) is rotated in the direction of the magnetization easy axis.

For instance, in the case where the magnetostriction constant of the first magnetic layer 10 (magnetization free layer) is positive, the magnetization direction of the first magnetic layer 10 (magnetization free layer) is set in a direction different from the direction of application of the tensile stress. On the other hand, in the case where the magnetostriction constant is negative, the direction perpendicular to the direction of application of the tensile stress is the magnetization easy axis.

FIG. 5C illustrates a state in the case where the magnetostriction constant is negative. In this case, the magnetization direction of the first magnetic layer 10 (magnetization free layer) is set in a direction different from the direction perpendicular to the direction of application of the tensile stress (X-axis direction in this example).

This figure shows an example of the magnetization direction of the second magnetic layer 20 (magnetization fixed layer). The magnetization direction does not need to be the direction shown in this figure.

The electrical resistance of the strain sensing element 50 (strain resistance change section 50*s*) is changed by e.g. the MR effect depending on the angle between the magnetization of the first magnetic layer 10 and the magnetization of the second magnetic layer 20.

The magnetostriction constant ($\lambda$s) represents the magnitude of the shape change of a ferromagnetic layer in response to saturation magnetization in a direction by application of an external magnetic field. The length in the state of no external magnetic field is denoted by L. The length L is changed by $\Delta L$ upon application of an external magnetic field. Then, the magnetostriction constant $\lambda$s is given by $\Delta L/L$. This amount of change is changed with the magnitude of the magnetic field. The magnetostriction constant $\lambda$s is expressed as $\Delta L/L$ in the saturated state of magnetization under application of a sufficient magnetic field.

For instance, in the case where the second magnetic layer 20 is a magnetization fixed layer, the second magnetic layer 20 is made of Fe, Co, Ni, or an alloy material thereof. Alternatively, the second magnetic layer 20 is made of a material in which an additive element is added to the aforementioned materials. The second magnetic layer 20 can be made of e.g. CoFe alloy, CoFeB alloy, and NiFe alloy. The thickness of the second magnetic layer 20 is e.g. 2 nanometers (nm) or more and 6 nm or less.

The intermediate layer 30 can be made of metal or insulator. The metal can be e.g. Cu, Au, and Ag. In the case of metal, the thickness of the intermediate layer 30 is e.g. 1 nm or more and 7 nm or less. The insulator can be e.g. magnesium oxide (such as MgO), aluminum oxide (such as $Al_2O_3$), titanium oxide (such as TiO), and zinc oxide (such as ZnO). In the case of insulator, the thickness of the intermediate layer 30 is e.g. 1 nm or more and 3 nm or less.

In the case where the first magnetic layer 10 is a magnetization free layer, the first magnetic layer 10 is made of e.g. at least one of Fe, Co, and Ni, or an alloy material including at least one of them. Alternatively, the first magnetic layer 10 is made of a material in which an additive element is added to the aforementioned materials.

The first magnetic layer 10 is made of a material having large magnetostriction. Specifically, the first magnetic layer 10 is made of a material with the absolute value of magnetostriction being larger than $10^{-5}$. Thus, the magnetization sensitively changes in response to strain. The first magnetic layer 10 may be made of a material having positive magnetostriction or a material having negative magnetostriction.

The first magnetic layer 10 can be made of e.g. FeCo alloy and NiFe alloy. Besides, the first magnetic layer 10 can be made of Fe—Co—Si—B alloy, Tb-M-Fe alloy exhibiting $\lambda$s>100 pm (M being Sm, Eu, Gd, Dy, Ho, or Er), Tb-M1-Fe-M2 alloy (M1 being Sm, Eu, Gd, Dy, Ho, or Er, and M2 being Ti, Cr, Mn, Co, Cu, Nb, Mo, W, or Ta), Fe-M3-M4-B alloy (M3 being Ti, Cr, Mn, Co, Cu, Nb, Mo, W, or Ta, and M4 being Ce, Pr, Nd, Sm, Tb, Dy, or Er), Ni, Al—Fe, or ferrite (such as $Fe_3O_4$ and $(FeCo)_3O_4$). The thickness of the first magnetic layer 10 is e.g. 2 nm or more.

The first magnetic layer 10 can have a two-layer structure. In this case, the first magnetic layer 10 can include a layer of FeCo alloy and the following layer stacked with the layer of FeCo alloy. The layer stacked with the layer of FeCo alloy is a layer of the material selected from Fe—Co—Si—B alloy, Tb-M-Fe alloy exhibiting $\lambda$s>100 pm (M being Sm, Eu, Gd, Dy, Ho, or Er), Tb-M1-Fe-M2 alloy (M1 being Sm, Eu, Gd, Dy, Ho, or Er, and M2 being Ti, Cr, Mn, Co, Cu, Nb, Mo, W, or Ta), Fe-M3-M4-B alloy (M3 being Ti, Cr, Mn, Co, Cu, Nb, Mo, W, or Ta, and M4 being Ce, Pr, Nd, Sm, Tb, Dy, or Er), Ni, Al—Fe, and ferrite (such as $Fe_3O_4$ and $(FeCo)_3O_4$).

For instance, in the case where the intermediate layer 30 is made of metal, the GMR effect is developed. In the case where the intermediate layer 30 is made of insulator, the TMR effect is developed. For instance, in the strain sensing element 50, the CPP (current perpendicular to plane)-GMR effect is used. In the CPP-GMR effect, a current is passed along e.g. the stacking direction of the strain resistance change section 50*s*.

Alternatively, the intermediate layer 30 can be a CCP (current-confined-path) spacer layer. In the CCP spacer layer, a plurality of metal current paths having a width (e.g., diameter) of approximately 1 nm or more and 5 nm or less are formed through part of the insulating layer in the film thickness direction. The CCP-GMR effect is used also in this case.

Thus, the inverse magnetostriction effect in the strain sensing element 50 is used in this embodiment. This enables sensing with high sensitivity. In the case of using the inverse magnetostriction effect, the magnetization direction of at least one of the first magnetic layer 10 and the second magnetic layer 20 is changed in response to e.g. the externally applied strain. The relative angle of the magnetization of the two magnetic layers is changed by the externally applied strain (its presence or absence, and the degree thereof). The electrical resistance is changed by the externally applied strain. Thus, the strain sensing element 50 functions as a pressure sensor.

Figure 6A:
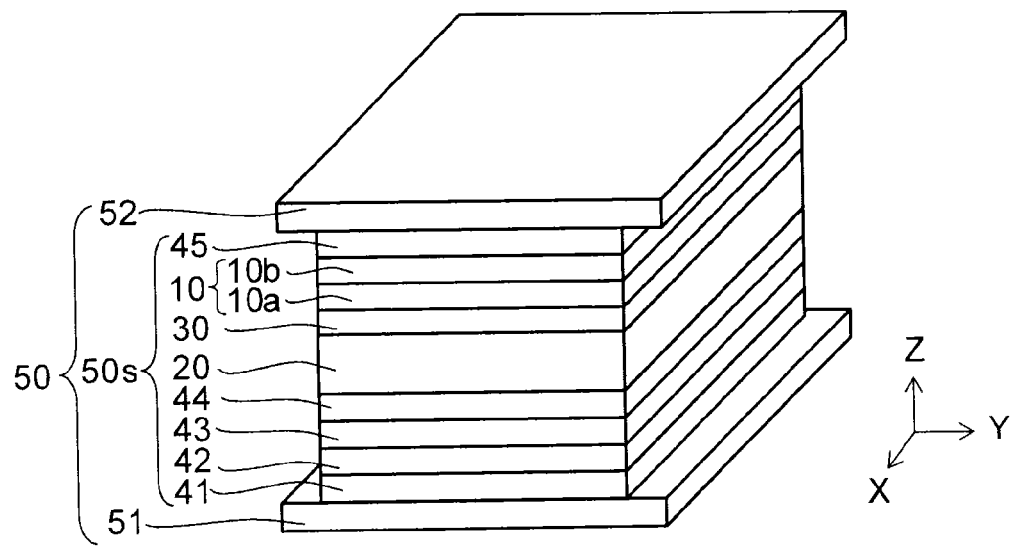
FIGS. 6A and 6B are schematic perspective views illustrating the configuration of part of the pressure sensor according to the first embodiment.
Figure 6B:
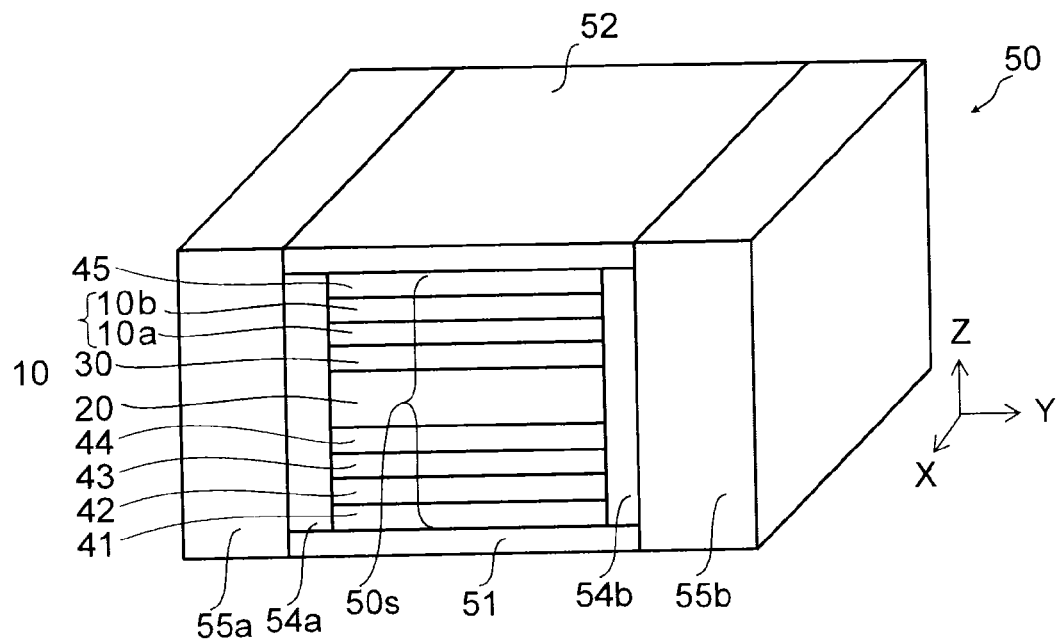

FIGS. 6A and 6B are schematic perspective views illustrating the configuration of part of the pressure sensor according to the first embodiment.

As shown in FIG. 6A, the strain sensing element 50 includes e.g. a first electrode 51 and a second electrode 52. The strain resistance change section 50s is provided between the first electrode 51 and the second electrode 52. In this example, from the first electrode 51 side toward the second electrode 52, the strain resistance change section 50s includes a buffer layer 41, an antiferromagnetic layer 42, a magnetic layer 43, a Ru layer 44, a second magnetic layer 20, an intermediate layer 30, a first magnetic layer 10, and a cap layer 45 provided in this order. The buffer layer 41 may double as a seed layer. The thickness of the buffer layer 41 is e.g. 1 nm or more and 10 nm or less. Specifically, the buffer layer 41 is an amorphous layer including e.g. Ta or Ti. Alternatively, the buffer layer 41 is a layer of e.g. Ru or NiFe serving as a seed layer for promoting crystal orientation. The buffer layer 41 may be a stacked film thereof. The thickness of the antiferromagnetic layer 42 is e.g. 5 nm or more and 10 nm or less. The thickness of the magnetic layer 43 is e.g. 2 nm or more and 6 nm or less. The thickness of the second magnetic layer 20 is e.g. 2 nm or more and 5 nm or less. The thickness of the intermediate layer 30 is e.g. 1 nm or more and 3 nm or less. The thickness of the first magnetic layer 10 is e.g. 2 nm or more and 5 nm or less. The thickness of the cap layer 45 is e.g. 1 nm or more and 5 nm or less.

The second magnetic layer 20 is made of e.g. a magnetic stacked film. The first magnetic layer 10 includes a magnetic stacked film 10a and a high magnetostriction magnetic film 10b. The magnetic stacked film 10a serves to increase the MR change rate. The thickness of the magnetic stacked film 10a is e.g. 1 nm or more and 3 nm or less. The magnetic stacked film 10a is made of e.g. CoFe-containing alloy or CoFe. The high magnetostriction magnetic film 10b is provided between the magnetic stacked film 10a and the cap layer 45. The thickness of the high magnetostriction magnetic film 10b is e.g. 1 nm or more and 5 nm or less.

The first electrode 51 and the second electrode 52 can be made of e.g. a nonmagnetic body such as Au, Cu, Ta, and Al. The first electrode 51 and the second electrode 52 may be made of a soft magnetic material. This can reduce external magnetic noise influencing the strain resistance change section 50s. The soft magnetic material can be e.g. permalloy (NiFe alloy) or silicon steel (FeSi alloy). The strain sensing element 50 is covered with insulator such as aluminum oxide (e.g., $Al_2O_3$) and silicon oxide (e.g., $SiO_2$) so as to prevent leakage current from flowing to the surroundings.

The magnetization direction of at least one of the first magnetic layer 10 and the second magnetic layer 20 is changed in response to stress. The absolute value of the magnetostriction constant of at least one magnetic layer (the magnetic layer changing its magnetization direction in response to stress) is preferably set to e.g. $10^{-5}$ or more. Thus, the magnetization direction is changed in response to externally applied strain by the inverse magnetostriction effect. For instance, at least one of the first magnetic layer 10 and the second magnetic layer 20 is made of e.g. a metal such as Fe, Co, and Ni, or an alloy including them. Depending on the element and additive element used therein, the magnetostriction constant is set to be large. The absolute value of the magnetostriction constant is preferably large. In view of the material for a feasible device, it is practical that the absolute value of the magnetostriction constant is approximately $10^{-2}$ or less.

For instance, the intermediate layer 30 is made of oxide such as MgO. A magnetic layer on the MgO layer typically has a positive magnetostriction constant. For instance, in the case of forming the first magnetic layer 10 on the intermediate layer 30, the first magnetic layer 10 is a magnetization free layer of the stacked configuration of CoFeB/CoFe/NiFe. If the uppermost NiFe layer is made Ni-rich, the magnetostriction constant of the NiFe layer is negative, and its absolute value is large. In order to suppress cancelation of the positive magnetostriction on the oxide layer, the Ni composition of the uppermost NiFe layer is not made so Ni-rich as the commonly-used permalloy composition of $Ni_{81}Fe_{19}$. Specifically, the ratio of Ni in the uppermost NiFe layer is preferably made less than 80 atomic percent (atomic %). In the case where the first magnetic layer 10 is a magnetization free layer, the thickness of the first magnetic layer 10 is preferably e.g. 1 nm or more and 20 nm or less.

In the case where the first magnetic layer 10 is a magnetization free layer, the second magnetic layer 20 may be either a magnetization fixed layer or a magnetization free layer. In the case where the second magnetic layer 20 is a magnetization fixed layer, the magnetization direction of the second magnetic layer 20 is not substantially changed even under external application of strain. The electrical resistance is changed by the relative angle of magnetization between the first magnetic layer 10 and the second magnetic layer 20. The presence or absence of strain is sensed by the difference in electrical resistance.

In the case where the first magnetic layer 10 and the second magnetic layer 20 are both magnetization free layers, for instance, the magnetostriction constant of the first magnetic layer 10 is set to be different from the magnetostriction constant of the second magnetic layer 20.

The second magnetic layer 20 may be a magnetization fixed layer or magnetization free layer. In both cases, the thickness of the second magnetic layer 20 is preferably e.g. 1 nm or more and 20 nm or less.

For instance, in the case where the second magnetic layer 20 is a magnetization fixed layer, for instance, the second magnetic layer 20 can be based on a synthetic AF structure using a stacked structure of antiferromagnetic layer/magnetic layer/Ru layer/magnetic layer. The antiferromagnetic layer is made of e.g. IrMn. As described later, a hard bias layer may be provided.

The strain sensing element 50 uses the spin of the magnetic layer. The strain sensing element 50 requires only a very small area. In terms of the length of the side of a square, for instance, the strain sensing element 50 only needs to have a size from 10 nm×10 nm to 20 nm×20 nm or more.

The area of the strain sensing element 50 is made sufficiently smaller than the area of the transducing thin film 64 warping by pressure. Here, as described above, the transducing thin film is a portion surrounded with a fixed end, having a fixed film thickness thinner than the fixed end, and configured to warp under external pressure. Specifically, the area of the strain sensing element 50 is ⅕ or less of the area of the transducing thin film 64 in the substrate surface. In general, as described above, the size of the transducing thin film 64 is approximately 60 µm or more and 600 µm or less. In the case where the diameter of the transducing thin film 64 is as small as approximately 60 µm, the length of one side of the strain sensing element 50 is e.g. 12 µm or less. When the diameter of the transducing thin film is 600 µm, the length of one side of the strain sensing element 50 is 120 µm or less. This value is e.g. the upper limit of the size of the strain sensing element 50.

Compared with the value of this upper limit, the aforementioned length of one side being 10 nm or more and 20 nm or less is extremely smaller. Thus, also in view of e.g. the processing accuracy of the element, there is no need to excessively downsize the strain sensing element 50. Accordingly, it is practically preferable that the size of one side of the strain sensing element 50 be set to e.g. approximately 0.5 µm or more and 20 µm or less. If the element size is extremely small, the demagnetizing field occurring in the strain sensing element 50 increases. This causes the problem of e.g. difficulty in bias control of the strain sensing element 50. If the element size is large, the problem of demagnetizing field does not occur. This makes it easy to handle the element from the engineering viewpoint. From that viewpoint, as described above, a preferable size is 0.5 µm or more and 20 µm or less.

For instance, the length of the strain sensing element 50 along the X-axis direction is 20 nm or more and 10 µm or less. Preferably, the length of the strain sensing element 50 along the X-axis direction is 200 nm or more and 5 µm or less.

For instance, the length of the strain sensing element 50 along the Y-axis direction (the direction perpendicular to the X-axis direction and parallel to the X-Y plane) is 20 nm or more and 10 µm or less. Preferably, the length of the strain sensing element 50 along the Y-axis direction is 200 nm or more and 5 µm or less.

For instance, the length of the strain sensing element 50 along the Z-axis direction (the direction perpendicular to the X-Y plane) is 20 nm or more and 100 nm or less.

The length of the strain sensing element 50 along the X-axis direction may be equal to or different from the length of the strain sensing element 50 along the Y-axis direction. Shape magnetic anisotropy occurs when the length of the strain sensing element 50 along the X-axis direction is different from the length of the strain sensing element 50 along the Y-axis direction. Thus, it is also possible to achieve a function similar to the function achieved by the hard bias layer.

The direction of the current passed in the strain sensing element 50 may be the direction from the first magnetic layer 10 toward the second magnetic layer 20, or the direction from the second magnetic layer 20 toward the first magnetic layer 10.

FIG. 6B illustrates an alternative configuration of part of the pressure sensor according to the first embodiment.

As shown in FIG. 6B, the strain sensing element 50 may include bias layers 55a and 55b (hard bias layers). The bias layers 55a and 55b are provided opposite to the strain resistance change section 50s.

In this example, the second magnetic layer 20 is a magnetization fixed layer. The bias layers 55a and 55b are juxtaposed with the second magnetic layer 20. The strain resistance change section 50s is placed between the bias layers 55a and 55b. An insulating layer 54a is provided between the bias layer 55a and the strain resistance change section 50s. An insulating layer 54b is provided between the bias layer 55b and the strain resistance change section 50s.

The bias layers 55a and 55b apply a bias magnetic field to the first magnetic layer 10. Thus, the magnetization direction of the first magnetic layer 10 can be biased to an optimal position. Furthermore, the first magnetic layer 10 can be turned into a single magnetic domain.

The size (in this example, the length along the Y-axis direction) of each of the bias layers 55a and 55b is e.g. 100 nm or more and 10 µm or less.

The size (in this example, the length along the Y-axis direction) of each of the insulating layers 54a and 54b is e.g. 1 nm or more and 5 nm or less.

Next, an example operation of this embodiment is described.

Figure 7A:
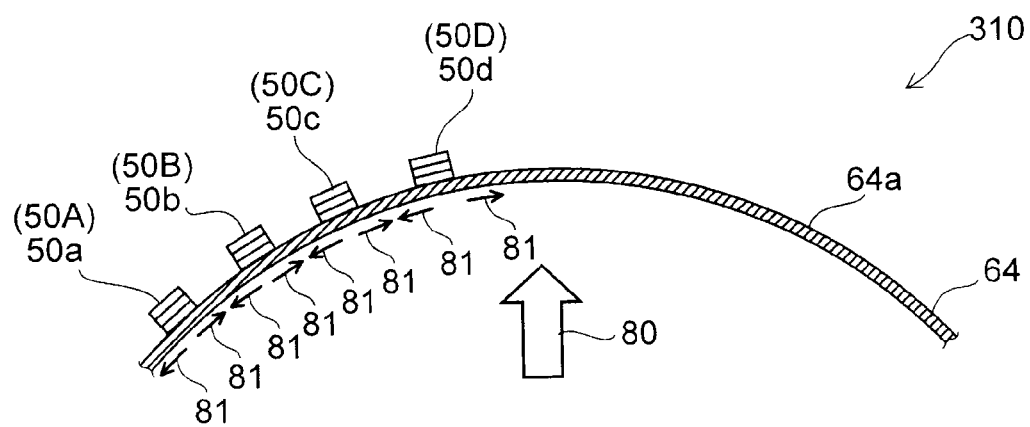
FIGS. 7A and 7B are schematic views illustrating the operation of the pressure sensor according to the first embodiment.
Figure 7B:
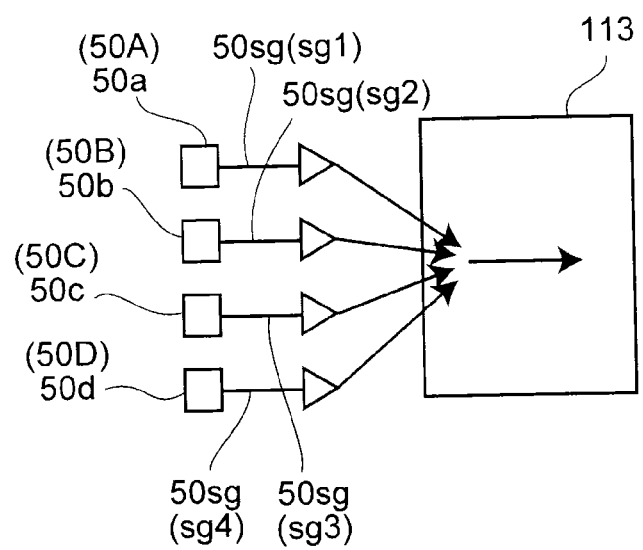

FIGS. 7A and 7B are schematic views illustrating the operation of the pressure sensor according to the first embodiment.

FIG. 7A is a schematic sectional view cut along the line 64d of FIG. 2. FIG. 7B is a schematic view illustrating the operation of the pressure sensor.

Figure 8A:
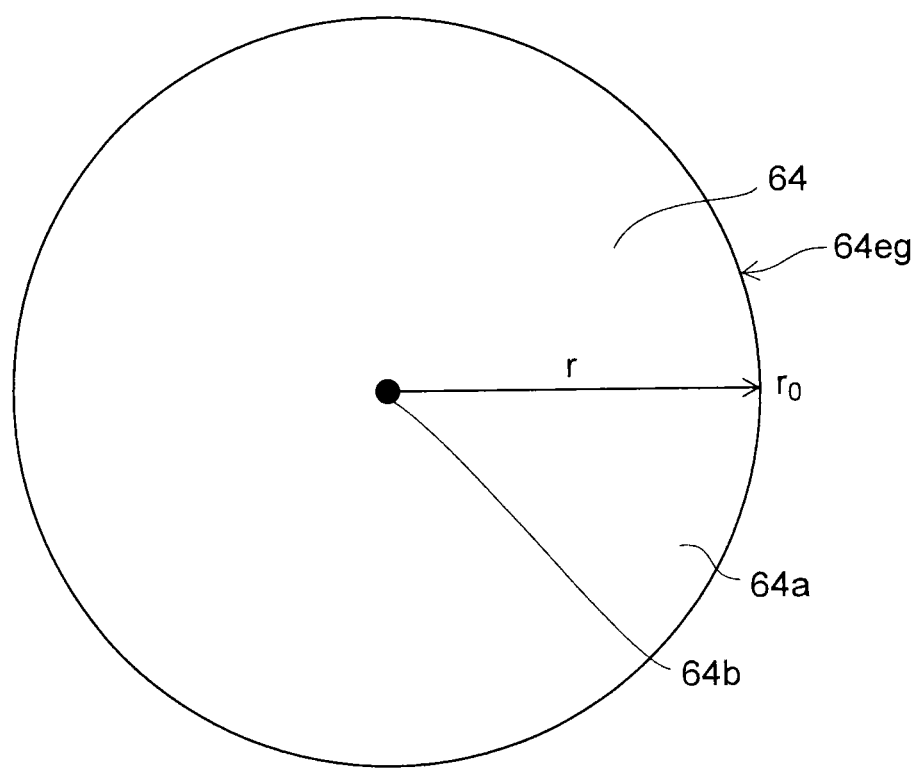
FIGS. 8A and 8B are schematic views illustrating the relationship between the position on the film surface of a transducing thin film and the strain.
Figure 8B:
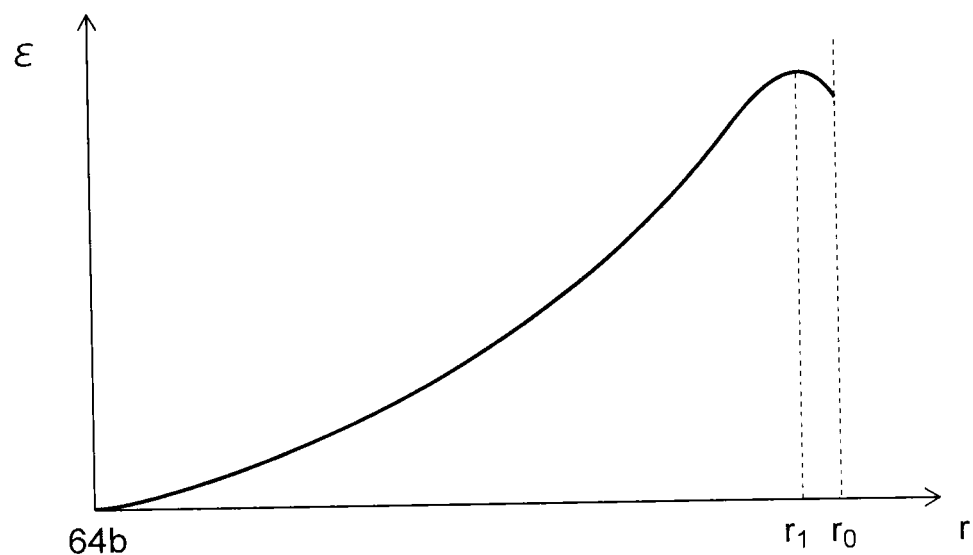

FIGS. 8A and 8B are schematic views illustrating the relationship between the position on the film surface of a transducing thin film and the strain.

FIG. 8A is a schematic plan view illustrating the film surface of the transducing thin film. FIG. 8B is a graph illustrating the relationship between the position on the film surface of the transducing thin film and the strain. The horizontal axis of the graph shown in FIG. 8B represents the distance from the barycenter 64b. The vertical axis of the graph shown in FIG. 8B represents the strain.

Figure 9A:
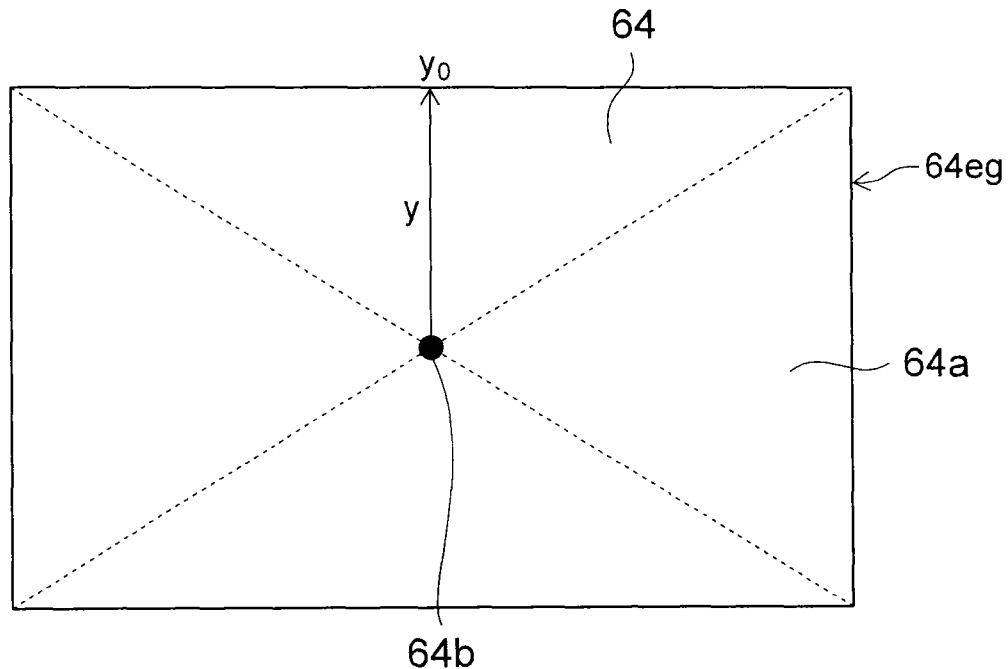
FIGS. 9A and 9B are schematic views illustrating the relationship between the position on the film surface of an alternative transducing thin film and the strain.
Figure 9B:
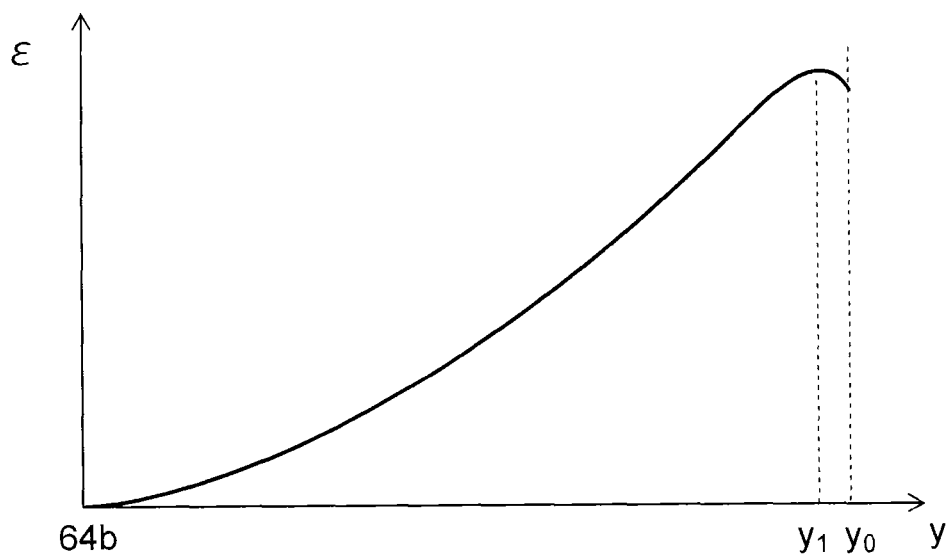

FIGS. 9A and 9B are schematic views illustrating the relationship between the position on the film surface of an alternative transducing thin film and the strain.

FIG. 9A is a schematic plan view illustrating the film surface of the alternative transducing thin film. FIG. 9B is a graph illustrating the relationship between the position on the film surface of the alternative transducing thin film and the strain. The horizontal axis of the graph shown in FIG. 9B represents the distance from the barycenter 64b. The vertical axis of the graph shown in FIG. 9B represents the strain.

Figure 10:
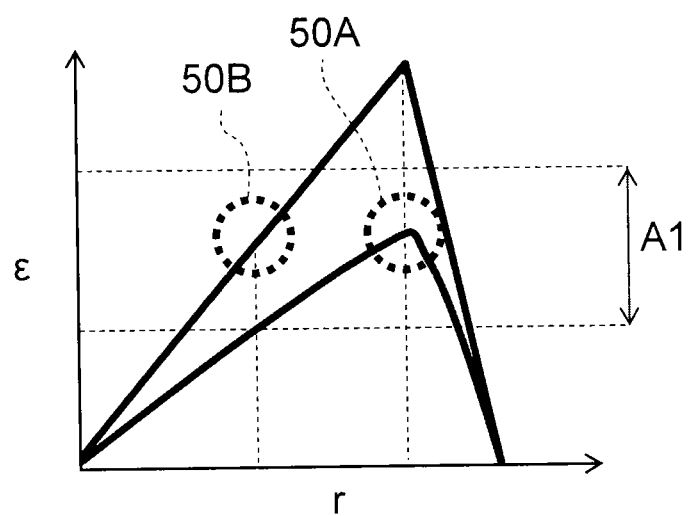
FIG. 10 is a graph illustrating the optimal strain range of the strain sensing element.

FIG. 10 is a graph illustrating the optimal strain range of the strain sensing element.

The horizontal axis of the graph shown in FIG. 10 represents the distance from the barycenter 64b. The vertical axis of the graph shown in FIG. 10 represents the strain.

As shown in FIG. 7A, in the pressure sensor 310 according to this embodiment, the transducing thin film 64 warps under the stress 80 applied from the medium such as air. For instance, the transducing thin film 64 warps so that the film surface 64a is made convex. Thus, a stress 81 (e.g., tensile stress) is applied to the transducing thin film 64. At this time, the stress 81 is applied also to the strain sensing element 50 provided on the film surface 64a of the transducing thin film 64 and generates a strain. Thus, in the strain sensing element 50, the electrical resistance between one end and the other end of the strain sensing element 50 is changed in response to the change of the strain by the inverse magnetostriction effect. In the case where the transducing thin film 64 warps so that the film surface 64a is made concave, a compressive stress is applied to the transducing thin film 64.

As shown in FIG. 7B, a signal 50sg in response to the aforementioned stress can be obtained from each of a plurality of strain sensing elements 50. For instance, a first signal sg1 is obtained from the first strain sensing element 50A. A second signal sg2 is obtained from the second strain sensing element 50B. A third signal sg3 is obtained from the third strain sensing element 50C. A fourth signal sg4 is obtained from the fourth strain sensing element 50D. The plurality of signals 50sg are processed by a processing circuit 113.

Here, as shown in FIGS. 8A and 8B, the shape of the film surface 64a of the transducing thin film 64 may be a circle. In this case, the strain of the film surface 64a increases with the distance r from the barycenter 64b of the film surface 64a of the transducing thin film 64. The strain of the film surface 64a is maximized at a position (position at distance $r_1$ from the barycenter 64b) slightly inside the fixed end (position at distance $r_0$ from the barycenter 64b) of the transducing thin film 64.

Alternatively, as shown in FIGS. 9A and 9B, the shape of the film surface 64a of the transducing thin film 64 may be a rectangle (here, including a square). Also in this case, the strain of the film surface 64a increases with the distance y from the barycenter 64b of the film surface 64a of the transducing thin film 64. The strain of the film surface 64a is maximized at a position (position at distance $y_1$ from the barycenter 64b) slightly inside the fixed end (position at distance $y_0$ from the barycenter 64b) of the transducing thin film 64.

The fixed end (position at distance $r_0$ from the barycenter 64b) of the transducing thin film 64 is fixed to the non-cavity section 71 (base body 71a) at the edge part 64eg. Thus, the strain of the fixed end of the transducing thin film 64 is smaller than the strain at the position (position at distance $y_1$ from the barycenter 64b) slightly inside the fixed end.

As shown in FIG. 10, the strain sensing element 50 has an optimal strain range A1. The strain sensing element 50 cannot sense the strain of the film surface 64a smaller than the optimal strain range A1. For the strain of the film surface 64a larger than the optimal strain range A1, the stress 81 applied to the strain sensing element 50 is excessive, and the strain generated in the strain sensing element 50 is excessive. Thus, the strain sensing element 50 cannot accurately sense the strain of the film surface 64a larger than the optimal strain range A1. If the gauge factor (GF) of the strain sensing element 50 is relatively high, the optimal strain range A1 is relatively narrow. The gauge factor of the strain sensing element 50 is the amount of change of electrical resistance (dR/R) per unit strain (dε).

For instance, the pressure sensor 310 may receive a pressure caused by a sound (sound wave) of high sound volume (e.g., a sound of approximately 140 dBspl or more). Then, of the plurality of strain sensing elements 50, the first strain sensing element 50A placed at the position farthest from the barycenter 64b may be subjected to an excessive stress 81. Thus, the strain generated in the first strain sensing element 50A may be made excessive. Then, the first strain sensing element 50A cannot accurately sense the strain of the film surface 64a. The first strain sensing element 50A transmits a saturated first signal sg1 to the processing circuit 113.

In contrast, in the pressure sensor 310 according to the embodiment, the processing circuit 113 performs switching processing between the first strain sensing element 50A and the second strain sensing element 50B when the first signal sg1 of the first strain sensing element 50A is larger than a first threshold (e.g., the upper limit of the optimal strain range A1). Thus, the processing circuit 113 outputs the second signal sg2 of the second strain sensing element 50B.

On the other hand, for instance, the pressure sensor 310 may receive a pressure caused by a sound (sound wave) of low sound volume. Then, of the plurality of strain sensing elements 50, the first strain sensing element 50A placed at the position farthest from the barycenter 64b may be subjected to a larger stress 81 than the second strain sensing element 50B. Thus, a larger strain is generated in the first strain sensing element 50A. Accordingly, the first strain sensing element 50A senses the strain of the film surface 64a with higher sensitivity and transmits a first signal sg1 to the processing circuit 113. The processing circuit 113 outputs the first signal sg1 of the first strain sensing element 50A when the first signal sg1 of the first strain sensing element 50A falls within the optimal strain range A1.

Thus, the processing circuit 113 outputs at least one of the first signal sg1 and the second signal sg2 as an output signal. The first signal sg1 is obtained from the first strain sensing element 50A when an external pressure is applied to the film surface 64a of the transducing thin film 64. The second signal sg2 is obtained from the second strain sensing element 50B when an external pressure is applied to the film surface 64a of the transducing thin film 64. Thus, the pressure sensor 310 according to the embodiment can sense e.g. the pressure with high sensitivity in a wide range from low sound volume to high sound volume. Accordingly, a pressure sensor 310 having a wide dynamic range can be realized.

The film surface 64a of the transducing thin film 64 moves when an external pressure is applied to the film surface 64a of the transducing thin film 64. The strain on the film surface 64a of the transducing thin film 64 at that time varies with the position on the film surface 64a as described above. On the other hand, a plurality of (N) strain sensing elements are used instead of a single strain sensing element 50. This increases the signal-to-noise ratio (SNR) of the pressure sensor 310. The amount of SNR improvement is given by the following equation.

$$SNR = SNR_{single\ element} + 20 \times \log(\sqrt{N}) \quad (1)$$

Here, the plurality of strain sensing elements 50 are electrically connected in series or parallel. In equation (1), a plurality of strain sensing elements 50 can be placed on the transducing thin film 64. In this case, use of a plurality of strain sensing elements 50 is more advantageous for SNR improvement. However, in the case of a spin MEMS sensor, anisotropy of the strain is one of the important factors because it uses an MR element. The strain sensing elements 50 need to be placed in a region in which the anisotropic strain applied to each of a plurality of strain sensing elements 50 has the same direction. Otherwise, the improvement effect based on the plurality of strain sensing elements 50 is not achieved.

On the other hand, one of the necessary conditions in this embodiment is that the strain sensing elements 50 are placed at positions where the magnitude of the strain is different under application of the same pressure. Thus, the following is a more preferable embodiment of the placement of the strain sensing elements 50 compatible with the SNR improvement based on the plurality of strain sensing elements 50 as described above.

Figure 11A:
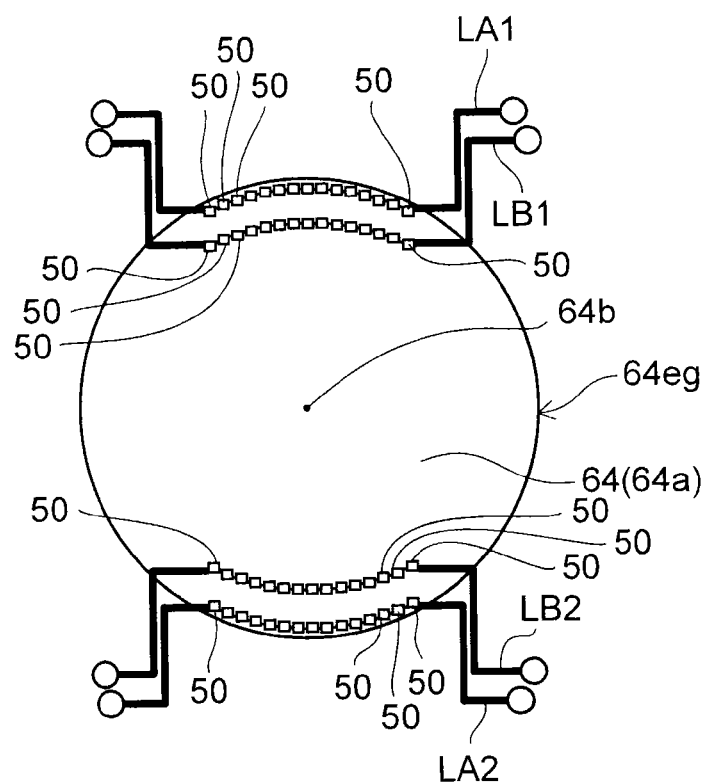
FIGS. 11A and 11B are schematic plan views showing examples of the pressure sensor according to this embodiment.
Figure 11B:
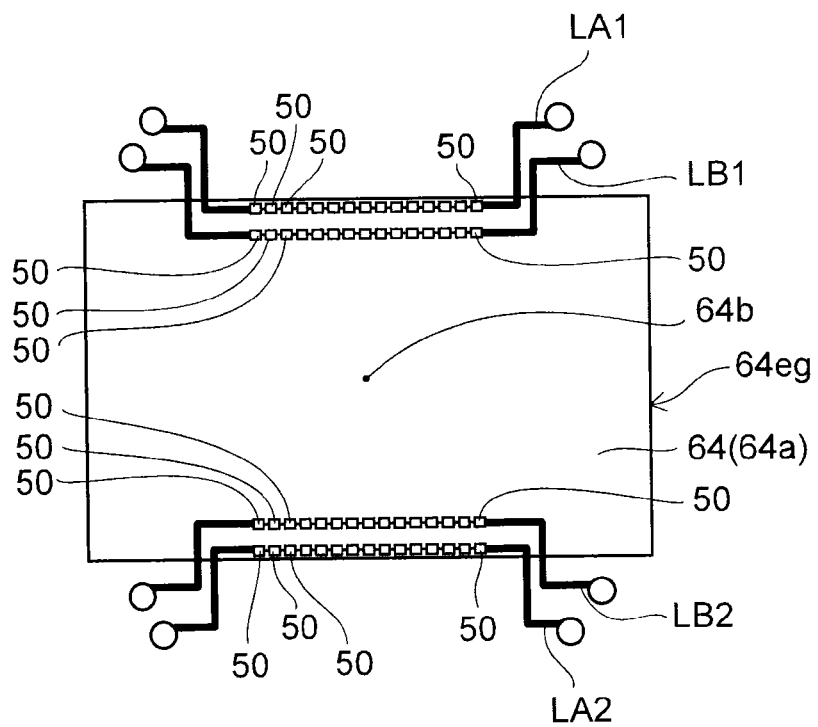

FIGS. 11A and 11B are schematic plan views showing examples of the pressure sensor according to this embodiment.

Figure 12A:
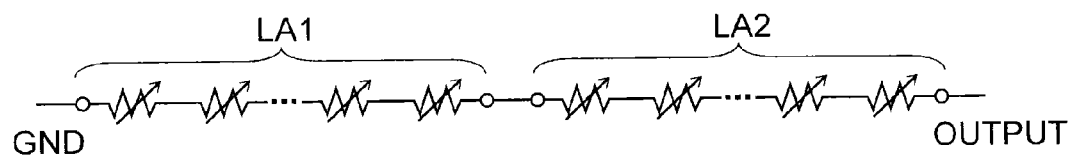
FIGS. 12A to 12C are schematic views showing examples of the connection form of sensor lines of this embodiment.
Figure 12B:
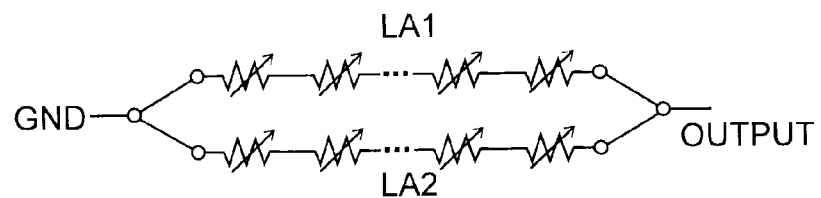
Figure 12C:
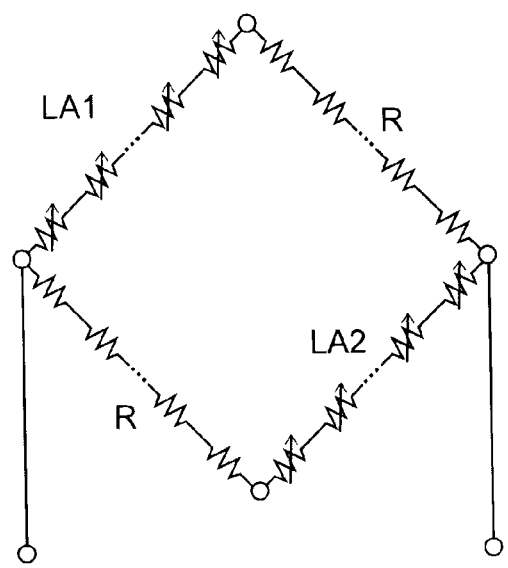

FIGS. 12A to 12C are schematic views showing examples of the connection form of sensor lines of this embodiment.

FIG. 11A is a schematic plan view showing an example in which the shape of the film surface of the transducing thin film is circular. FIG. 11B is a schematic plan view showing an example in which the shape of the film surface of the transducing thin film is rectangular.

In the examples shown in FIGS. 11A and 11B, the magnitude of the strain is different in two levels. Furthermore, a plurality of strain sensing elements 50 are placed on the film surface 64a of the transducing thin film 64. In the example shown in FIG. 11A, four sensor lines are provided as electrically series connected sensor lines. The first A-line LA1 (first line) includes fifteen strain sensing elements 50 connected in series. The strain sensing elements 50 are placed near the circumferential fixed end so as to maximize the strain. Likewise, also on the second A-line LA2 (second line), fifteen strain sensing elements 50 are placed so as to maximize the strain. These are located at symmetric positions where the vectors of x-y anisotropic strains are almost similar when the transducing thin film 64 is deformed. The position of twelve o'clock is referred to as angle 0 degrees. The position of six o'clock is referred to as angle 180 degrees. It is assumed that the magnetization fixed direction of the strain sensing elements 50 is set so that the strain sensing elements 50 are responsive near 0 or 180 degrees.

As shown in FIG. 12A, the first A-line LA1 and the second A-line LA2 may be connected in series to each other for SNR improvement. Alternatively, as shown in FIG. 12B, the first A-line LA1 and the second A-line LA2 may be connected in parallel to each other. Alternatively, as shown in FIG. 12C, the first A-line LA1 and the second A-line LA2 may be used to form a bridge circuit.

On the other hand, the first B-line LB1 (third line) and the second B-line LB2 (fourth line) are both placed at a position of r nearer to the barycenter position. In this case, the strain under application of the same pressure as the foregoing is smaller than that of the A-line (first A-line LA1 and second A-line LA2: first strain sensing element group). Thus, this example is advantageous in the case of sensing higher sound volume. Alternatively, this example is advantageous in the case where the pressure sensor having higher sensitivity because of the variation of the transducing thin film 64 is shipped as a product of SNR comparable to the other pressure sensors. In this case, the signal of the sensor of the B-line (first B-line LB1 and second B-line LB2: second strain sensing element group) placed at a position of a smaller amount of strain is intentionally used as an output signal. Also in the B-line, as in the A-line, as shown in FIG. 12A, the first B-line LB1 and the second B-line LB2 may be electrically connected in series to each other. Alternatively, as shown in FIG. 12B, the first B-line LB1 and the second B-line LB2 may be connected in parallel to each other. Alternatively, as shown in FIG. 12C, the first B-line LB1 and the second B-line LB2 may form a bridge circuit.

In the example shown in FIG. 11B, the shape of the film surface 64a of the transducing thin film 64 is rectangular. Thus, the x-y anisotropic strain can be obtained in a larger region than on the circular film surface 64a. Also in the case of the rectangular film surface 64a, the strain under pressure application is larger in the region near the fixed end. Thus, under application of a small pressure at which the output is not saturated, the output of the sensor of the A-line is larger than the output of the sensor of the B-line, and the output of the sensor of the B-line is smaller than the output of the sensor of the A-line. As in the case of the circular film surface 64a, the B-line is placed at a position farther from the barycenter than the A-line. As in the case of the circular film surface 64a, the first A-line LA1 and the second A-line LA2 may be connected in series to each other for SNR improvement (see FIG. 12A). Alternatively, the first A-line LA1 and the second A-line LA2 may be connected in parallel to each other (see FIG. 12B). Alternatively, the first A-line LA1 and the second A-line LA2 may be used to form a bridge circuit (see FIG. 12C).

On the other hand, the B-lines are both placed at a position of r nearer to the barycenter position. In this case, the strain under application of the same pressure as the foregoing is smaller than that of the A-line. Thus, this example is advantageous in the case of sensing higher sound volume. Alternatively, this example is advantageous in the case where the pressure sensor having higher sensitivity because of the variation of the transducing thin film 64 is shipped as a product of SNR comparable to the other pressure sensors. In this case, the signal of the sensor of the B-line placed at a position of a smaller amount of strain is intentionally used as an output signal. Also in the B-line, as in the A-line, the first B-line LB1 and the second B-line LB2 may be electrically connected in series to each other (see FIG. 12A). Alternatively, the first B-line LB1 and the second B-line LB2 may be connected in parallel to each other (see FIG. 12B). Alternatively, the first B-line LB1 and the second B-line LB2 may form a bridge circuit (see FIG. 12C).

Figure 13A:
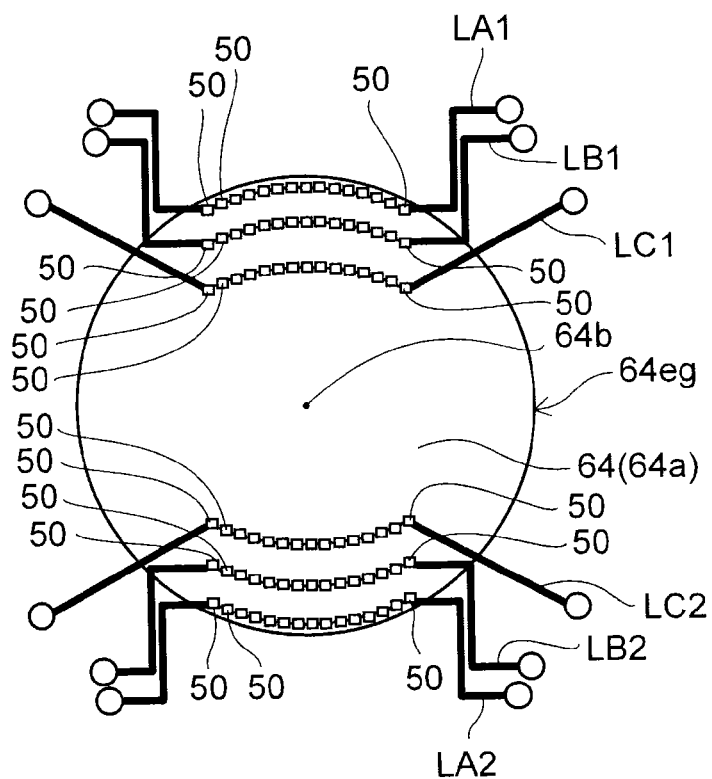
FIGS. 13A and 13B are schematic plan views showing examples of the pressure sensor according to this embodiment.
Figure 13B:
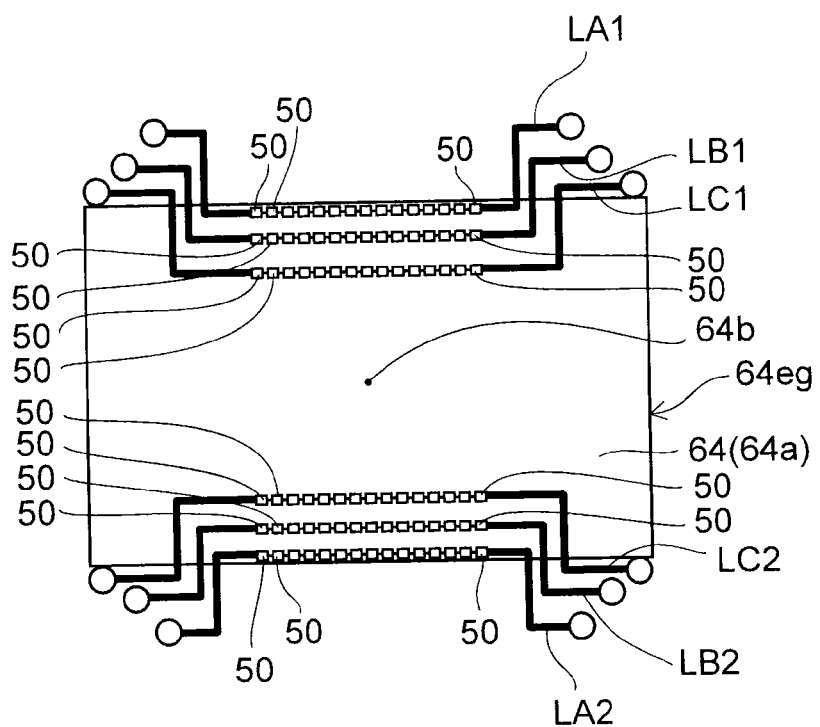

FIGS. 13A and 13B are schematic plan views showing examples of the pressure sensor according to this embodiment.

FIG. 13A is a schematic plan view showing an example in which the shape of the film surface of the transducing thin film is circular. FIG. 13B is a schematic plan view showing an example in which the shape of the film surface of the transducing thin film is rectangular.

In the examples shown in FIGS. 13A and 13B, the strain sensing elements 50 placed at different positions constitute not only two lines of the A-line and the B-line, but constitute three lines of the A-line, the B-line, and the C-line.

The method of use is similar to that of the examples described above with reference to FIGS. 11A to 12C.

Here, FIGS. 11A and 11B show examples in which a plurality of strain sensing elements 50 series connected at different distances from the barycenter constitute two lines. FIGS. 13A and 13B show examples in which a plurality of strain sensing elements 50 series connected at different distances from the barycenter constitute three lines. The number of lines is not limited to two or three, but may be four or five as long as there are two or more lines of sensors.

Figure 14A:
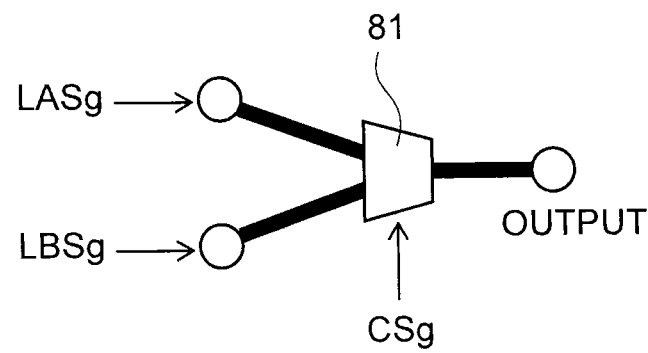
FIGS. 14A and 14B are schematic views showing circuits subsequent to the output of the lines.
Figure 14B:
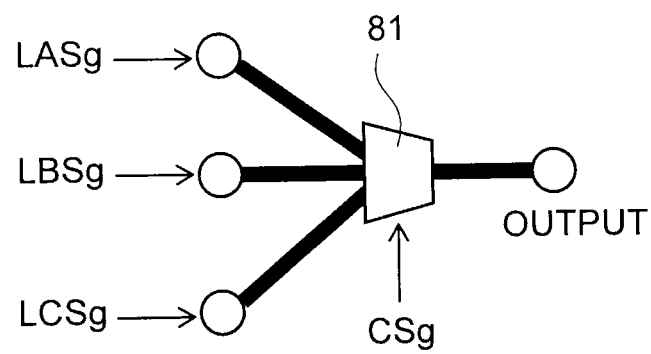

FIGS. 14A and 14B are schematic views showing circuits subsequent to the output of the lines.

Figure 15A:
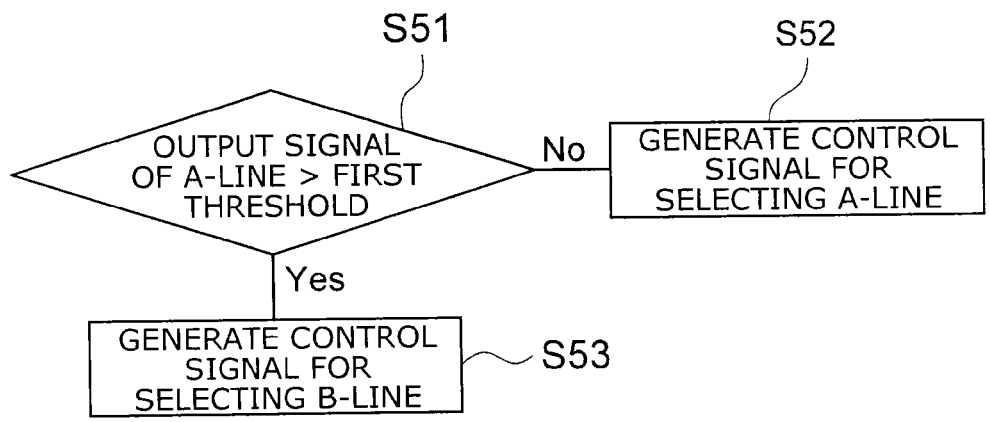
FIGS. 15A and 15B are flow charts illustrating a method for generating a control signal.
Figure 15B:
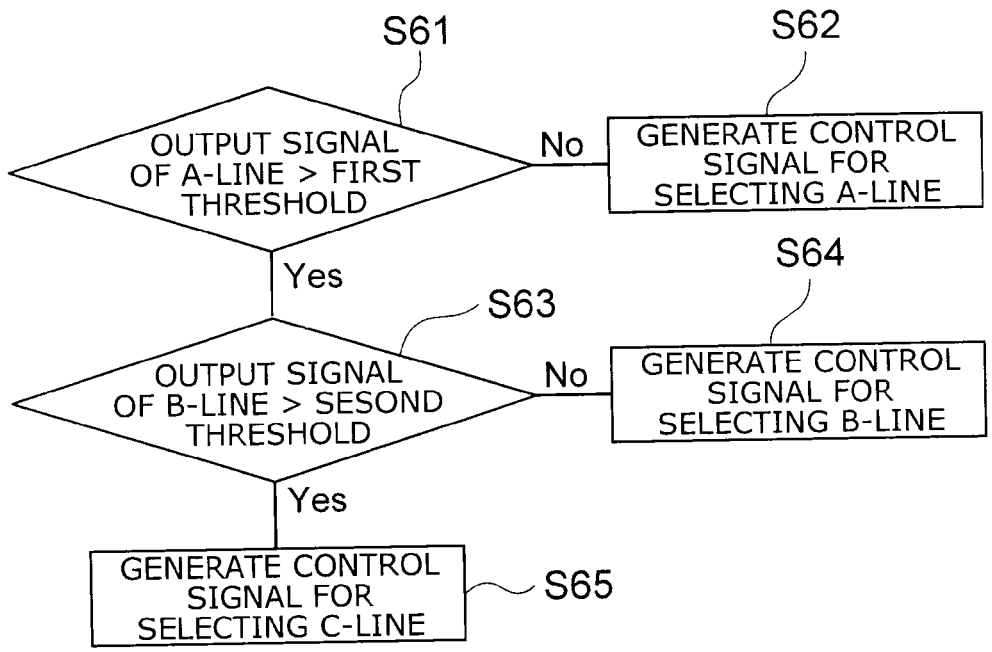

FIGS. 15A and 15B are flow charts illustrating a method for generating a control signal.

FIGS. 14A and 15A show an example of two lines. FIGS. 14B and 15B show an example of three lines.

The line of the output signal LASg from the A-line and the line of the output signal LBSg from the B-line are connected to a multiplexer 81. The multiplexer 81 is a circuit for receiving input signals from a plurality of lines and selecting one line for output. The line of a control signal CSg for determining which line to output is connected to the multiplexer 81. In the example shown in FIG. 14A, based on the control signal CSg, the multiplexer 81 outputs one of the output signal LASg of the A-line and the output signal LBSg of the B-line in real time during measurement. In the example shown in FIG. 14B, based on the control signal CSg, the multiplexer 81 outputs one of the output signal LASg of the A-line, the output signal LBSg of the B-line, and the output signal LCSg of the C-line in real time during measurement. The line supplying the signal used as an output signal may be determined by generating a control signal CSg based on the output signal LASg from the A-line and the output signal LBSg from the B-line. Alternatively, a different sensor for control determination may be placed on the transducing thin film to generate a control signal CSg based on the signal of the different sensor.

An example of generating a control signal CSg based on the output signal LASg from the A-line and the output signal LBSg from the B-line is illustrated with reference to FIG. 15A. It is determined whether the output signal LASg from the A-line exceeds a prescribed saturation threshold (first threshold) (step S51). In the case where the output signal LASg of the A-line does not exceed the first threshold (step S51: No), a control signal CSg for selecting the A-line is generated (step S52). In the case where the output signal LASg of the A-line exceeds the first threshold (step S51: Yes), a large pressure that cannot be sensed is applied to the A-line. Thus, a control signal CSg for selecting the B-line is generated (step S53).

The case where the C-line is further provided is illustrated with reference to FIG. 15B. The output signal LASg of the A-line is measured. It is determined whether the output signal LASg exceeds a prescribed threshold of the A-line (first threshold) (step S61). If the output signal LASg of the A-line does not exceed the first threshold (step S61: No), a control signal CSg for selecting the A-line is generated (step S62). In the case where the output signal LASg of the A-line exceeds the first threshold (step S61: Yes), the output signal LBSg of the B-line is measured. It is determined whether the output signal LBSg exceeds a prescribed threshold of the B-line (second threshold) (step S63). If the output signal LBSg of the B-line does not exceed the second threshold (step S63: No), a control signal CSg for selecting the B-line is generated (step S64). In the case where the output signal LBSg of the B-line exceeds the second threshold (step S63: Yes), a large pressure that cannot be sensed is applied to both the A-line and the B-line. Thus, a control signal CSg for selecting the C-line is generated (step S65).

Such a control determination is performed in real time during measurement. This requires that the clock frequency of the processor for generating the control signal CSg be sufficiently faster than the variation of the measurement target. The clock frequency is originally sufficient for the measurement of the pressure without fast variation such as atmospheric pressure. In the case of sound, in the audible range, the clock frequency can sufficiently support up to 20 kHz even at high frequency. Even in measuring supersonic waves, the clock frequency can sufficiently support the target of approximately several ten to hundred kHz. The clock frequency of the processor for generating the control signal CSg needs to be at least 100 times or more, and preferably 1000 times or more the frequency of the measurement target as described above. In the case of the audible range up to 20 kHz, the clock frequency only needs to be 2 megahertz (MHz) to 20 MHz. For supersonic waves at approximately 100 kHz, the clock frequency only needs to be approximately 10-100 MHz, and preferably needs to be several ten to hundred MHz or more. In measuring supersonic waves of 1 MHz, the clock frequency only needs to be 100 MHz to 1 GHz. In any case, these values can be sufficiently realized as the clock frequency of the processor although the cost changes with the clock frequency. Thus, the selection and control determination in real time can be performed during measurement.

Examples of the operation of this embodiment are further described with reference to the drawings.

Figure 16A:
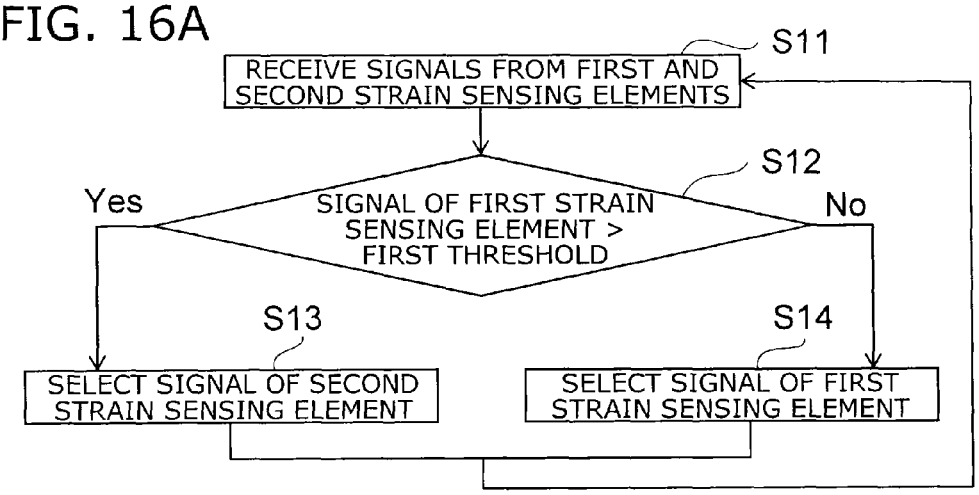
FIGS. 16A and 16B are flow charts illustrating the operation of the pressure sensor according to the first embodiment.
Figure 16B:
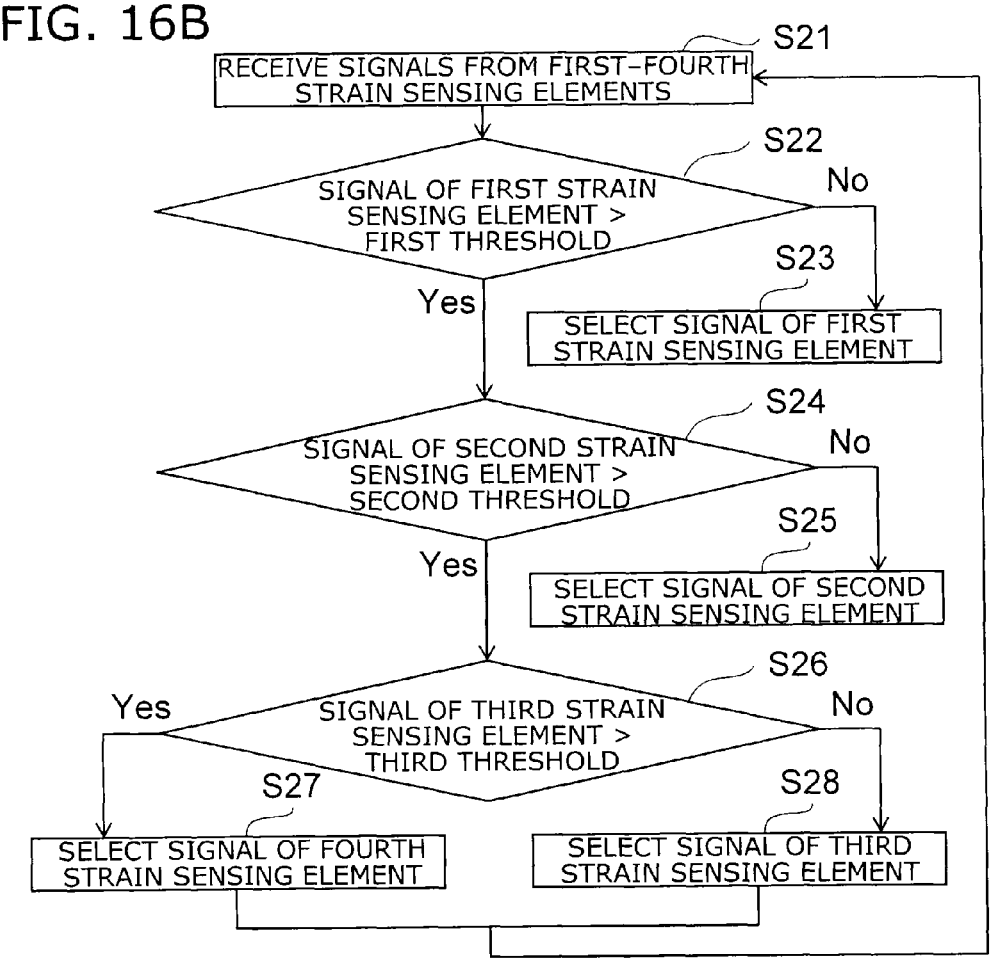

FIGS. 16A and 16B are flow charts illustrating the operation of the pressure sensor according to the first embodiment.

As shown in FIG. 16A, the pressure sensor 310 may include the first strain sensing element 50A and the second strain sensing element 50B. In this case, the processing circuit 113 receives (acquires) a first signal sg1 from the first strain sensing element 50A. The processing circuit 113 receives a second signal sg2 from the second strain sensing element 50B (step S11).

Next, the processing circuit 113 determines whether the first signal sg1 of the first strain sensing element 50A is larger than a first threshold (e.g., the upper limit of the optimal strain range A1) (step S12). In the case where the first signal sg1 of the first strain sensing element 50A is not larger than the first threshold (step S12: No), the processing circuit 113 selects (outputs) the first signal sg1 of the first strain sensing element 50A (step S14). On the other hand, in the case where the first signal sg1 of the first strain sensing element 50A is larger than the first threshold (step S12: Yes), the processing circuit 113 performs switching processing between the first strain sensing element 50A and the second strain sensing element 50B. Thus, the processing circuit 113 selects (outputs) the second signal sg2 of the second strain sensing element 50B (step S13).

Next, the processing circuit 113 receives a first signal sg1 from the first strain sensing element 50A. The processing circuit 113 receives a second signal sg2 from the second strain sensing element 50B. Then, the processing circuit 113 repeats the operation described above with reference to steps S11-S14 (steps S11-S14).

As shown in FIG. 16B, the pressure sensor 310 may include the first strain sensing element 50A, the second strain sensing element 50B, the third strain sensing element 50C, and the fourth strain sensing element 50D. In this case, the processing circuit 113 receives a first signal sg1 from the first strain sensing element 50A. The processing circuit 113 receives a second signal sg2 from the second strain sensing element 50B. The processing circuit 113 receives a third signal sg3 from the third strain sensing element 50C. The processing circuit 113 receives a fourth signal sg4 from the fourth strain sensing element 50D (step S21).

Next, the processing circuit 113 determines whether the first signal sg1 of the first strain sensing element 50A is larger than a first threshold (e.g., the upper limit of the optimal strain range A1) (step S22). In the case where the first signal sg1 of the first strain sensing element 50A is not larger than the first threshold (step S22: No), the processing circuit 113 selects (outputs) the first signal sg1 of the first strain sensing element 50A (step S23). On the other hand, in the case where the first signal sg1 of the first strain sensing element 50A is larger than the first threshold (step S22: Yes), the processing circuit 113 performs switching processing between the first strain sensing element 50A and the second strain sensing element 50B. Thus, the processing circuit 113 determines whether the second signal sg2 of the second strain sensing element 50B is larger than a second threshold (e.g., the upper limit of the optimal strain range A1) (step S24).

In the case where the second signal sg2 of the second strain sensing element 50B is not larger than the second threshold (step S24: No), the processing circuit 113 selects (outputs) the second signal sg2 of the second strain sensing element 50B (step S25). On the other hand, in the case where the second signal sg2 of the second strain sensing element 50B is larger than the second threshold (step S24: Yes), the processing circuit 113 performs switching processing between the second strain sensing element 50B and the third strain sensing element 50C. Thus, the processing circuit 113 determines whether the third signal sg3 of the third strain sensing element 50C is larger than a third threshold (e.g., the upper limit of the optimal strain range A1) (step S26).

In the case where the third signal sg3 of the third strain sensing element 50C is not larger than the third threshold (step S26: No), the processing circuit 113 selects (outputs) the third signal sg3 of the third strain sensing element 50C (step S28). On the other hand, in the case where the third signal sg3 of the third strain sensing element 50C is larger than the third threshold (step S26: Yes), the processing circuit 113 performs switching processing between the third strain sensing element 50C and the fourth strain sensing element 50D. Thus, the processing circuit 113 selects (outputs) the fourth signal sg4 of the fourth strain sensing element 50D (step S27).

Next, the processing circuit 113 receives a first signal sg1 from the first strain sensing element 50A. The processing circuit 113 receives a second signal sg2 from the second strain sensing element 50B. The processing circuit 113 receives a third signal sg3 from the third strain sensing element 50C. The processing circuit 113 receives a fourth signal sg4 from the fourth strain sensing element 50D. Then, the processing circuit 113 repeats the operation described above with reference to steps S21-S28 (steps S21-S28).

Thus, the pressure sensor 310 according to the embodiment can sense the pressure in a wider range with high sensitivity. Accordingly, a pressure sensor 310 having a wider dynamic range can be realized. Furthermore, the processing circuit 113 repeats the operation. This enables dynamic switching processing. Thus, the processing circuit 113 can respond relatively rapidly to e.g. the pressure in a wide range from low sound volume to high sound volume.

In the pressure sensor 310 according to the embodiment, the switching clock of the processing circuit 113 needs to be sufficiently higher than the frequency of the sensed pressure (e.g., the pressure caused by the sensed sound). In this context, the frequency of audible sound is e.g. approximately 10 kilohertz (kHz) or less. The clock frequency of the processing circuit 113 is approximately in the order of e.g. gigahertz (GHz). The clock frequency of the processing circuit 113 is higher than the frequency of audible sound by approximately five orders of magnitude. Thus, the pressure sensor 310 according to the embodiment can sense the pressure in a wide frequency band with high sensitivity.

(Second Embodiment)

Figure 17:
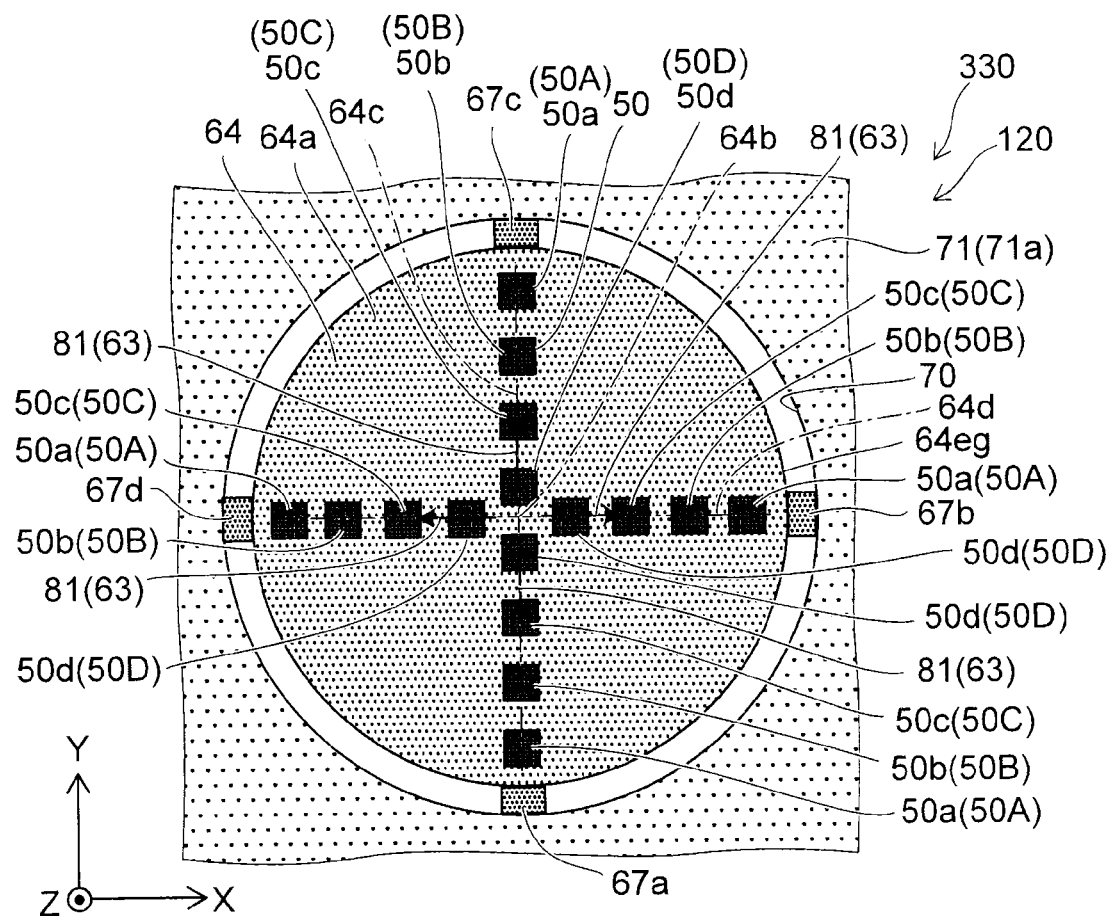
FIG. 17 is a schematic plan view illustrating the configuration of an alternative pressure sensor according to a second embodiment.

FIG. 17 is a schematic plan view illustrating the configuration of an alternative pressure sensor according to a second embodiment.

As shown in FIG. 17, in the pressure sensor 330, a plurality of strain sensing elements 50 are substantially equally spaced along the straight line 64c and the straight line 64d. For instance, four strain sensing elements 50 are placed on each side of the center (corresponding to the barycenter 64b) on the straight line 64c. Four strain sensing elements 50 are placed on each side of the center (corresponding to the barycenter 64b) on the straight line 64d. In this example, the strain sensing elements 50 are placed at substantially symmetric positions with respect to the barycenter 64b.

More specifically, the pressure sensor 330 according to this embodiment also includes a plurality of strain sensing elements 50. For instance, the sensor section 72 (first sensor section 72A) includes a first strain sensing element 50A, a second strain sensing element 50B, a third strain sensing element 50C, and a fourth strain sensing element 50D.

For instance, the first strain sensing element 50A is the strain sensing element 50a. The second strain sensing element 50B is the strain sensing element 50b. The third strain sensing element 50C is the strain sensing element 50c. The fourth strain sensing element 50D is the strain sensing element 50d. The straight lines (straight line 64d and straight line 64c) passing through the first strain sensing element 50A (strain sensing element 50a), the second strain sensing element 50B (strain sensing element 50b), the third strain sensing element 50C (strain sensing element 50c), and the fourth strain sensing element 50D (strain sensing element 50d) pass through the barycenter 64b.

In the pressure sensor 330, fixing parts 67a and 67c are placed at cross points of the straight line 64c and the edge part 64eg of the transducing thin film 64. A fixing part 67b and a fixing part 67d are placed at cross points of the straight line 64d and the edge part 64eg of the transducing thin film 64.

The fourth strain sensing element 50D, the third strain sensing element 50C, the second strain sensing element 50B, and the first strain sensing element 50A are arranged in this order along the straight line 64d from the barycenter 64b toward the fixing part 67d.

The fourth strain sensing element 50D, the third strain sensing element 50C, the second strain sensing element 50B, and the first strain sensing element 50A are arranged in this order along the straight line 64d from the barycenter 64b toward the fixing part 67b.

The fourth strain sensing element 50D, the third strain sensing element 50C, the second strain sensing element 50B, and the first strain sensing element 50A are arranged in this order along the straight line 64c from the barycenter 64b toward the fixing part 67a.

The fourth strain sensing element 50D, the third strain sensing element 50C, the second strain sensing element 50B, and the first strain sensing element 50A are arranged in this order along the straight line 64c from the barycenter 64b toward the fixing part 67c.

For instance, the first strain sensing element 50A is the strain sensing element 50a. The second strain sensing element 50B is the strain sensing element 50c. The straight lines (straight line 64d and straight line 64c) passing through the first strain sensing element 50A (strain sensing element 50a) and the second strain sensing element 50B (strain sensing element 50c) pass through the barycenter 64b.

The pressure sensor 330 according to the embodiment performs the operation described above with reference to FIGS. 7A to 16B. Thus, the pressure sensor 330 can sense e.g. the pressure with high sensitivity in a wide range from low sound volume to high sound volume. Accordingly, a pressure sensor 310 having a wide dynamic range can be realized. The pressure sensor 330 according to the embodiment can sense the pressure in a wide frequency band with high sensitivity.

Figure 18:
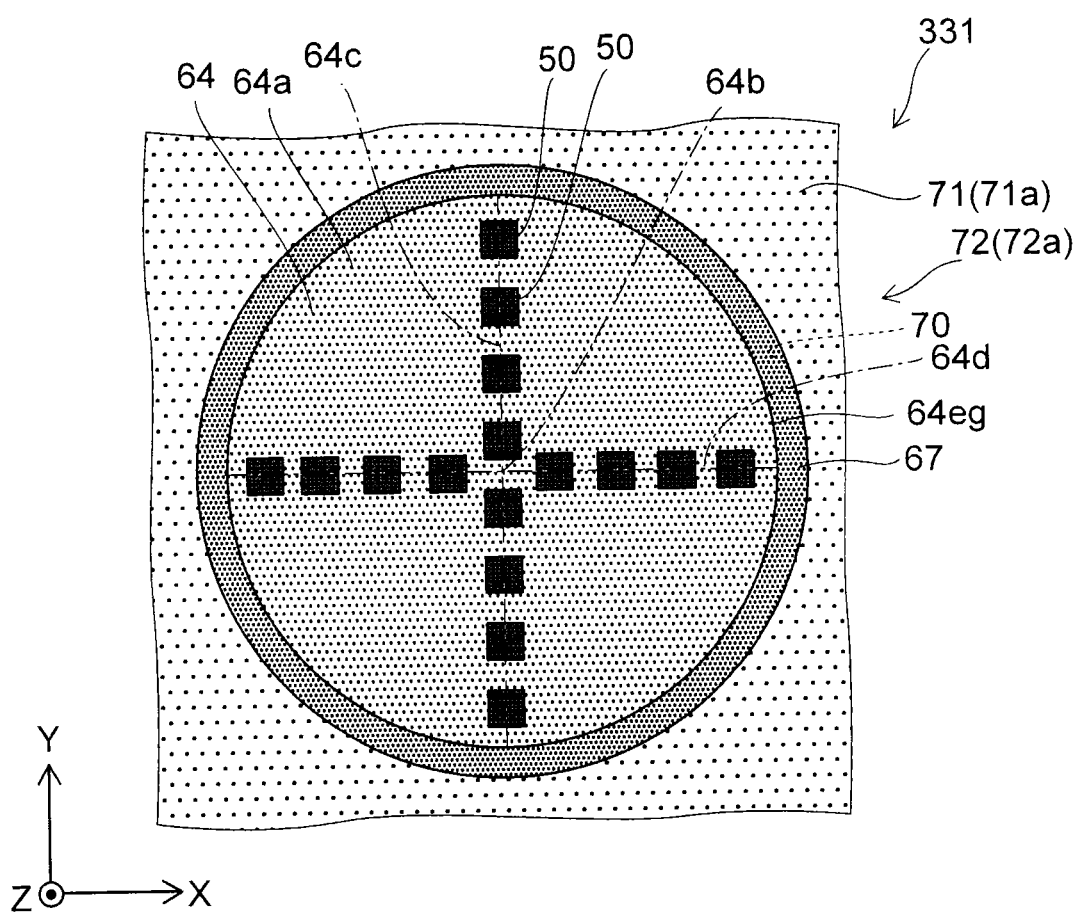
FIG. 18 is a schematic plan view illustrating the configuration of an alternative pressure sensor according to the second embodiment.

FIG. 18 is a schematic plan view illustrating the configuration of an alternative pressure sensor according to the second embodiment.

As shown in FIG. 18, in the pressure sensor 331 according to this embodiment, the fixing part 67 is shaped like a ring. The fixing part 67 lies along the edge part 64eg of the transducing thin film 64. The fixing part 67 continuously fixes the edge part 64eg of the transducing thin film 64. Because the edge part 64eg of the transducing thin film 64 is continuously fixed, the amount of warpage of the transducing thin film 64 can be made dependent on the distance from the barycenter 64b.

Figure 19:
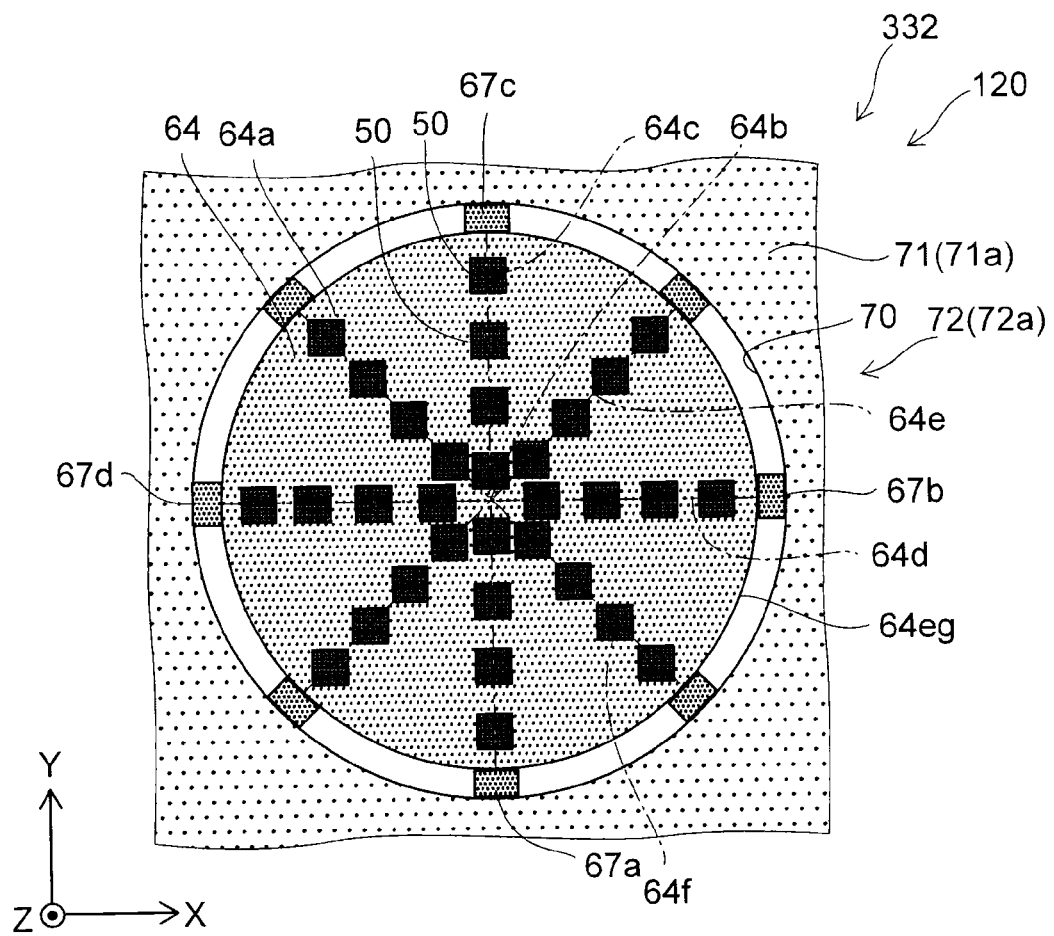
FIG. 19 is a schematic plan view illustrating the configuration of an alternative pressure sensor according to the second embodiment.

FIG. 19 is a schematic plan view illustrating the configuration of an alternative pressure sensor according to the second embodiment.

As shown in FIG. 19, in the alternative pressure sensor 332 according to this embodiment, a plurality of strain sensing elements 50 are substantially equally spaced along the straight line 64c and the straight line 64d. Four strain sensing elements 50 are placed on each side of the barycenter 64*b* on the straight line 64*c*. Four strain sensing elements 50 are placed on each side of the barycenter 64*b* on the straight line 64*d*.

Each of the pressure sensor 331 and the pressure sensor 332 performs the operation described above with reference to FIGS. 7A to 16B. Thus, the pressure sensor 331 and the pressure sensor 332 can sense e.g. the pressure with high sensitivity in a wide range from low sound volume to high sound volume. Accordingly, a pressure sensor 310 having a wide dynamic range can be realized. Each of the pressure sensor 331 and the pressure sensor 332 can sense the pressure in a wide frequency band with high sensitivity.

(Third Embodiment)

This embodiment relates to a method for manufacturing a pressure sensor (e.g., the pressure sensor according to the first embodiment).

Figure 20:
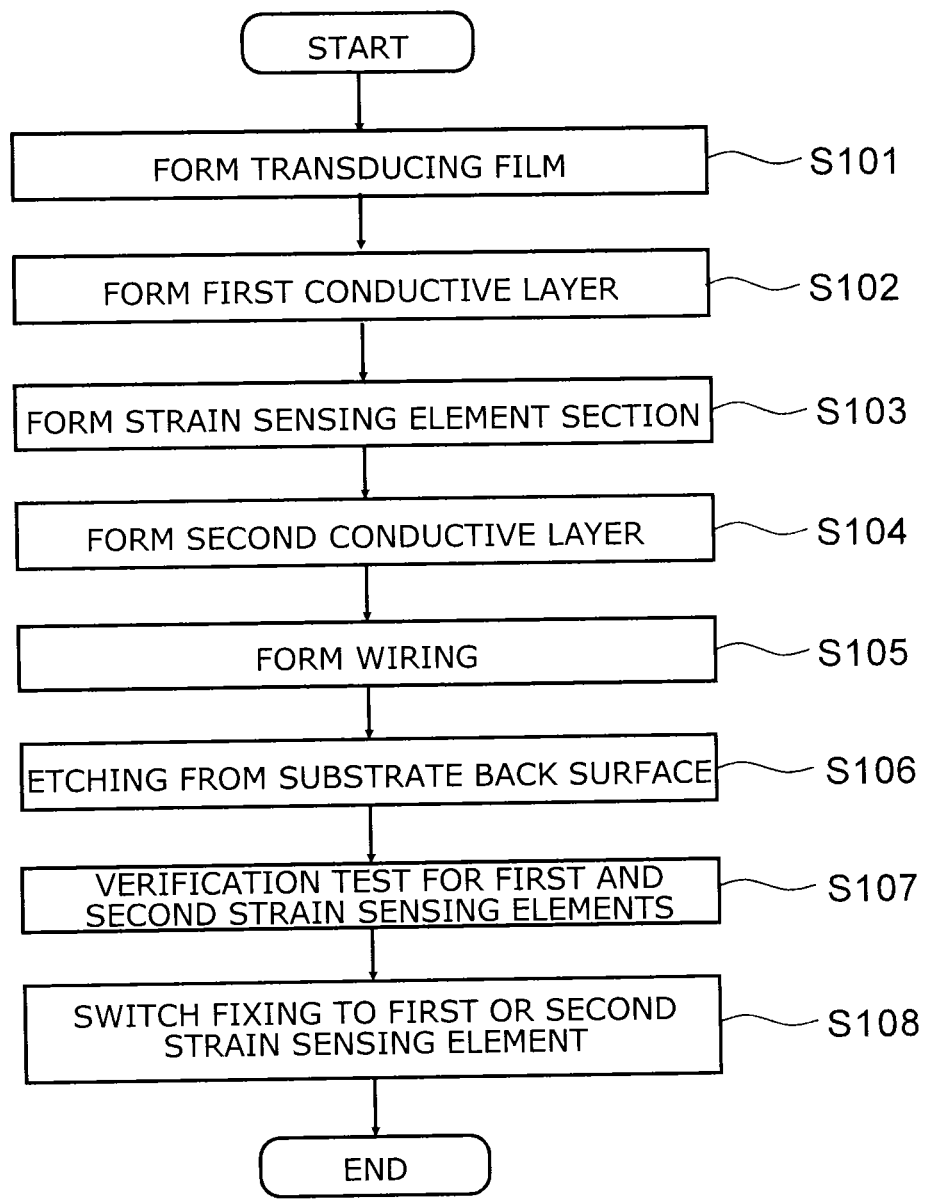
FIG. 20 is a flow chart illustrating the method for manufacturing a pressure sensor according to a third embodiment.

FIG. 20 is a flow chart illustrating the method for manufacturing a pressure sensor according to a third embodiment.

FIGS. 21A to 21D are sequential schematic perspective views illustrating the method for manufacturing a pressure sensor according to the third embodiment.

Figure 22A:
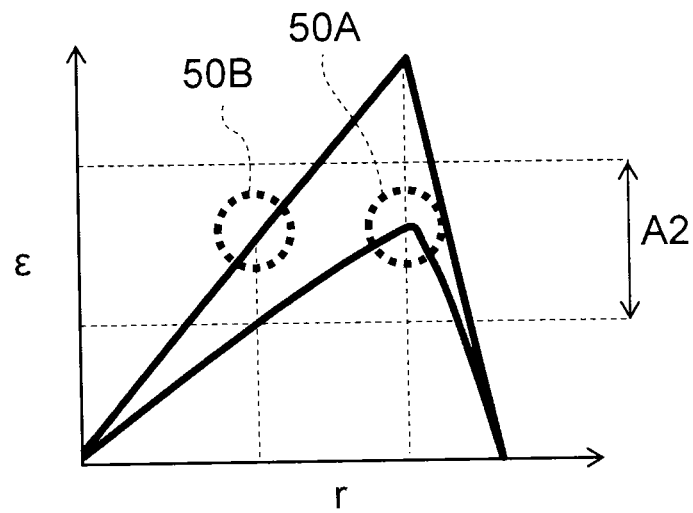
FIGS. 22A and 22B are schematic views describing the verification step in the method for manufacturing a pressure sensor according to the third embodiment.
Figure 22B:
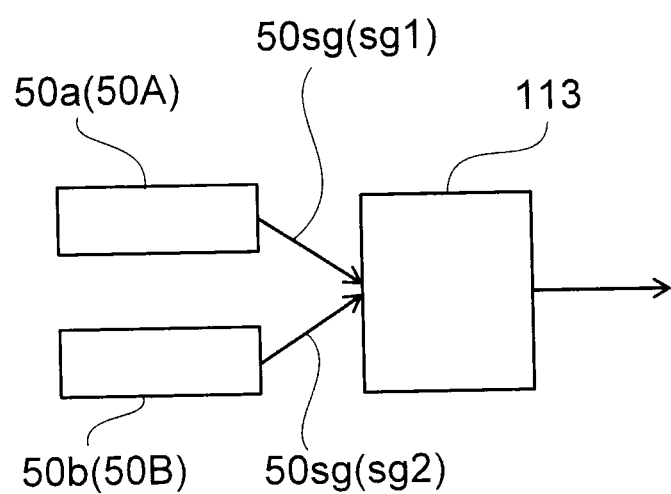

FIGS. 22A and 22B are schematic views describing the verification step in the method for manufacturing a pressure sensor according to the third embodiment.

The horizontal axis of the graph shown in FIG. 22A represents distance from the barycenter 64*b*. The vertical axis of the graph shown in FIG. 22A represents strain.

These figures show an example of the method for manufacturing the pressure sensor 310. In FIGS. 21A to 21D, for clarity of illustration, the shape and size of each component are appropriately changed from FIG. 1.

FIG. 22A is a graph illustrating the optimal strain range of the strain sensing element. FIG. 22B is a schematic view illustrating the operation of the pressure sensor in the verification step.

As shown in FIG. 20, a transducing film is formed (step S101).

Figure 21A:
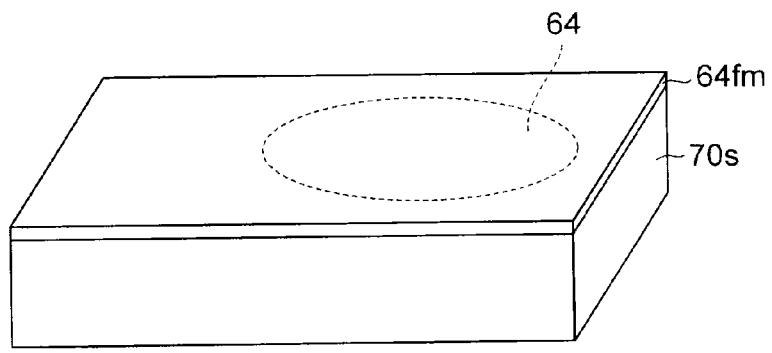
FIGS. 21A to 21D are sequential schematic perspective views illustrating the method for manufacturing a pressure sensor according to the third embodiment.

For instance, as shown in FIG. 21A, a transducing film 64*fm* constituting a transducing thin film 64 is formed on a substrate 70*s*. The substrate 70*s* is e.g. a silicon substrate. The transducing film 64*fm* is e.g. a silicon oxide film. For instance, the pressure sensor 330 (see FIG. 17) according to the second embodiment includes fixing parts (e.g., fixing parts 67*a*-67*d*) for discontinuously holding the edge part 64*eg* of the transducing thin film 64. In the case of forming these fixing parts, the transducing film 64*fm* may be processed to form a portion constituting the fixing part 67 in this step.

As shown in FIG. 20, a first conductive layer is formed (step S102).

Figure 21B:
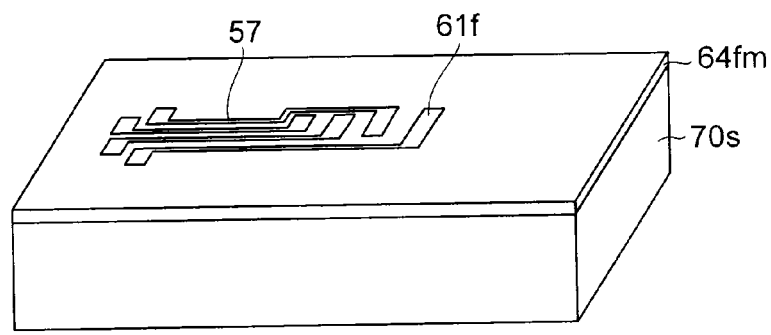

For instance, as shown in FIG. 21B, a conductive film is formed on the transducing film 64*fm* (or the transducing thin film 64). This conductive film is processed into a prescribed shape to form a first conductive layer (conductive layer 61*f*). This conductive layer can constitute e.g. at least part of the first wiring 57.

As shown in FIG. 20, a strain sensing element 50 is formed (step S103).

Figure 21C:
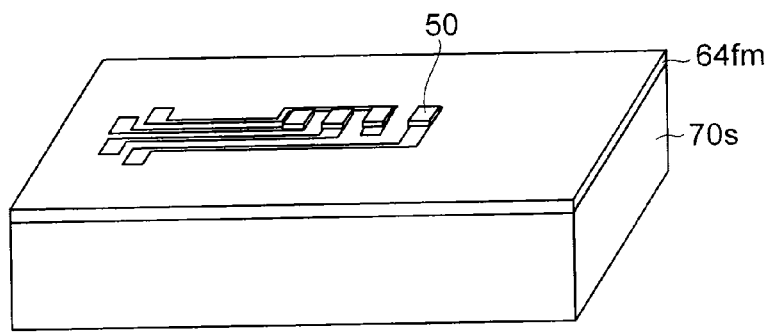

For instance, as shown in FIG. 21C, a stacked film constituting a strain sensing element 50 is formed on part of the conductive layer 61*f*. This stacked film includes e.g. a buffer layer, a seed layer, an antiferromagnetic layer, a magnetic layer, a magnetic coupling layer, a magnetic layer, an intermediate layer, a magnetic layer, a high magnetostriction film, and a cap layer stacked in this order. This stacked film is processed into a prescribed shape to form a strain sensing element 50 (e.g., strain sensing elements 50*a*-50*d*).

As shown in FIG. 20, a second conductive layer is formed (step S104).

Figure 21D:
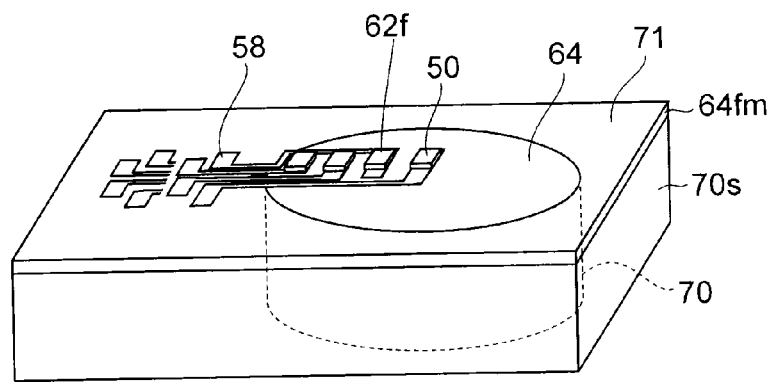

For instance, as shown in FIG. 21D, an insulating film, not shown, is formed so as to cover the strain sensing element 50. Part of this insulating film is removed to expose the upper surface of the strain sensing element 50. A conductive film is formed thereon and processed into a prescribed shape. Thus, a second conductive layer (conductive layer 62*f*) is obtained.

As shown in FIG. 20, a wiring (e.g., first wiring 57) connected to the first conductive layer and a wiring (e.g., second wiring 58) connected to the second conductive layer are formed (step S105). The wiring may be formed from at least one of the formation of the first conductive layer and the formation of the second conductive layer described above. More specifically, at least part of the step for processing the wiring may be performed simultaneously with at least part of the formation of the first conductive layer, the formation of the second conductive layer, and the formation of the strain sensing element. That is, at least part of steps S102-S105 may be performed simultaneously or in a different order as long as technically feasible.

As shown in FIG. 20, etching is performed from the back surface (lower surface) of the substrate 70*s* (step S106). This processing is performed by e.g. deep RIE. At this time, the Bosch process may be performed.

Thus, as shown in FIG. 21D, a cavity section 70 is formed in the substrate 70*s*. The portion in which the cavity section 70 is not formed constitutes a non-cavity section 71. Thus, a transducing thin film 64 is formed.

A fixing part 67 may be formed to continuously hold the edge part 64*eg* of the transducing thin film 64 (e.g., the pressure sensor 331). In this case, the fixing part 67 is formed simultaneously with the transducing thin film 64 by performing etching from the back surface of the substrate 70*s*.

Thus, in this manufacturing method, a film (transducing film 64*fm*) constituting a transducing thin film 64 is formed on a semiconductor substrate. A film constituting a strain sensing element 50 (strain resistance change section) is formed thereon and patterned into the shape of an element. After forming the element, the element is made electrically continuous. Then, etching is performed from the substrate back surface to the transducing thin film 64*fm* to form a transducing thin film 64. This embodiment can manufacture a pressure sensor with high sensitivity.

Here, variation may occur in the structure of the transducing thin film 64 manufactured by the manufacturing method described above with reference to steps S101-S106. This may cause variation in the performance of the transducing thin film 64 (such as SNR (signal-to-noise ratio)). The "variation" in this example includes e.g. variation between production lots.

In this context, the method for manufacturing a pressure sensor according to the embodiment performs a verification test for the first strain sensing element 50A and the second strain sensing element 50B (step S107). More specifically, as shown in FIGS. 22A and 22B, it is verified whether the first signal sg1 transmitted from the first strain sensing element 50A to the processing circuit 113 is larger than a first threshold (e.g., the upper limit of the optimal strain range A1). In the case where the first signal sg1 of the first strain sensing element 50A is not larger than the first threshold, the first strain sensing element 50A is selected and fixed (step S108). At this time, the step of blocking the second signal sg2 transmitted from the second strain sensing element 50B to the processing circuit 113 is performed. For instance, the wiring connecting the second strain sensing element 50B to the processing circuit 113 is broken (step S108).

On the other hand, in the case where the first signal sg1 of the first strain sensing element 50A is larger than the first threshold, the second strain sensing element 50B is selected and fixed (step S108). At this time, the step of blocking the first signal sg1 transmitted from the first strain sensing element 50A to the processing circuit 113 is performed. For instance, the wiring connecting the first strain sensing element 50A to the processing circuit 113 is broken (step S108).

Here, FIGS. 22A and 22B have been described with reference to two strain sensing elements 50. However, the verification test may be performed on three or more strain sensing elements 50.

The method for manufacturing a pressure sensor according to the embodiment can address more flexibly the variation in the performance of the transducing thin film 64 by adopting applicable strain sensing elements 50. This can improve the efficiency of manufacturing a pressure sensor.

Examples of absorbing the manufacturing variation of the transducing thin film 64 are further described with reference to the drawings.

Figure 23A:
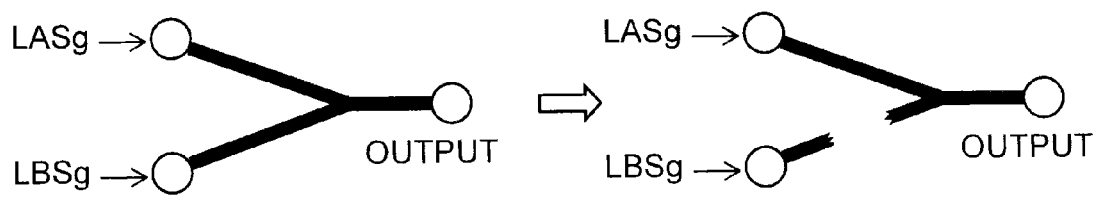
FIGS. 23A and 23B are schematic views showing examples of fixing and outputting one of a plurality of lines.
Figure 23B:
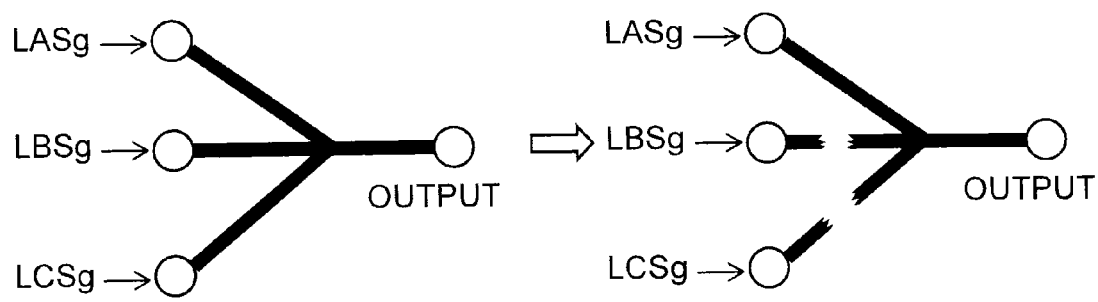

FIGS. 23A and 23B are schematic views showing examples of fixing and outputting one of a plurality of lines.

FIG. 23A shows an example of two lines. FIG. 23B shows an example of three lines.

In the examples of FIGS. 23A and 23B, the output signal LASg from the A-line and the output signal LBSg from the B-line are not switched and outputted in real time. Instead, the electrical circuit is formed so as to fix and output one of the lines. There may be manufacturing variation in which the sensitivity of the transducing thin film 64 is high or low. In this case, the products are not shipped as pressure sensors or acoustic microphones having different SNR due to the manufacturing variation. Instead, it is determined in the pre-shipment inspection which of the A-line and the B-line is used as the final output. Then, the product is configured so that only one of the lines is used for the output signal. Thus, the SNR variation at product shipment is suppressed.

Although not shown, after completion of the sensor device, the output signal LASg from the A-line is measured, and the output signal LBSg from the B-line is measured. From the measurement result, it is determined which line is selected for the signal of the final output at product shipment. Based on the determination result, one of the output signal LASg of the A-line and the output signal LBSg of the B-line is electrically blocked and prevented from the final output. Then, the product is shipped. This means for electrical blocking may be selecting one of the A-line and the B-line using a selection switch (electrical switch). Alternatively, this means for electrical blocking may be physically breaking the wiring (turning the wiring to the high resistance state, or insulating the wiring by scratching).

FIG. 23A shows an example of two lines, i.e., A-line and B-line. The same also applies to three lines, i.e., A-line, B-line, and C-line, as shown in FIG. 23B, or four or more lines, although not shown.

In this case, the pressure or sound cannot be acquired with so wide a dynamic range as the examples described above with reference to FIGS. 14A and 14B. However, the manufacturing variation of the transducing thin film 64, if any, is avoided. The products can be shipped with uniform sensitivity and SNR for the final output of the products.

In the case of application to acoustic sensors (microphones), the variation of sensors does not cause a significant problem in the usage as a single microphone. On the other hand, the variation of sensors may be significant in the case of using a plurality of microphones (acoustic processing system) for noise canceling, speech recognition, and determining the failure or abnormality of machines. In this case, a set of a plurality of microphones with uniform performance may be more significant than a mixture of a plurality of microphones including single microphones with high performance and microphones with standard performance.

(Fourth Embodiment)

Figure 24:
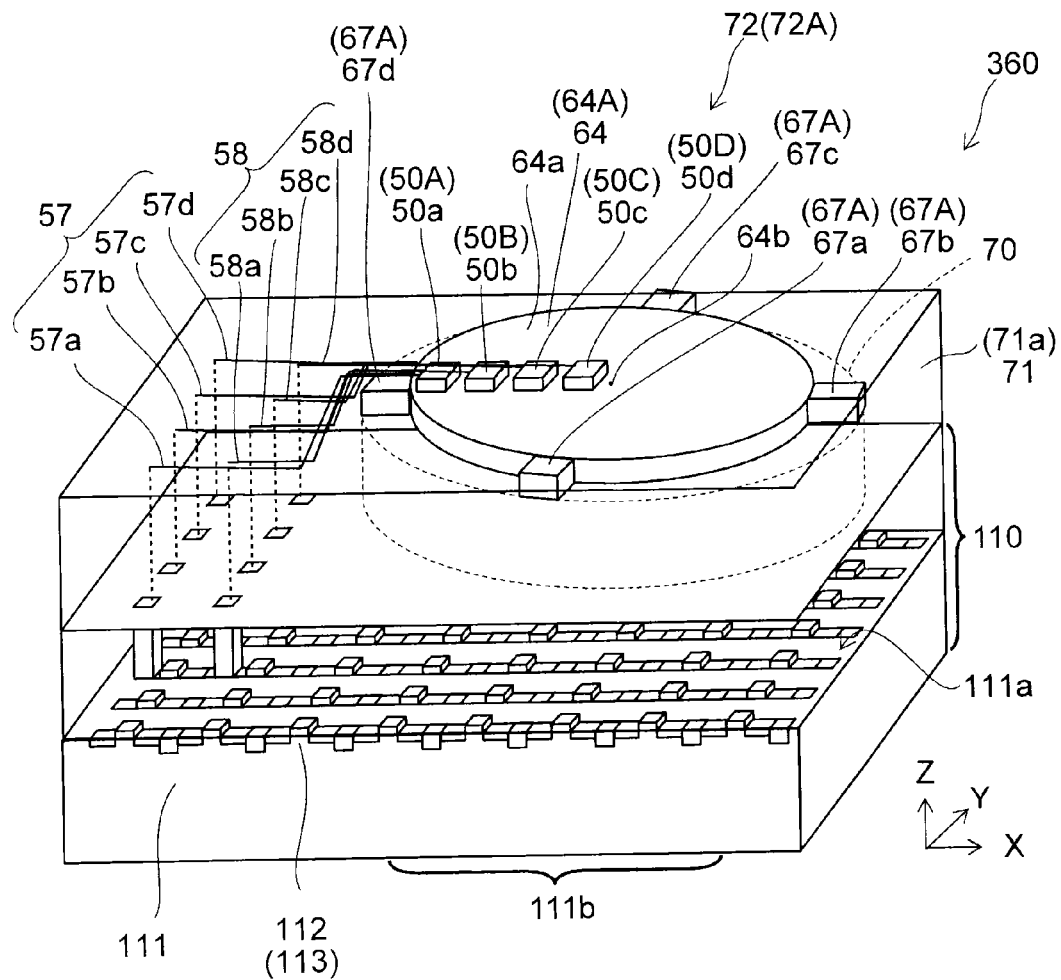
FIG. 24 is a schematic perspective view illustrating a pressure sensor according to a fourth embodiment.

FIG. 24 is a schematic perspective view illustrating a pressure sensor according to a fourth embodiment.

As shown in FIG. 24, the pressure sensor 360 according to this embodiment includes a semiconductor circuit section 110 in addition to the base body 71a and the sensor section 72 (first sensor section 72A). The base body 71a is provided on the semiconductor circuit section 110. The sensor section 72 is provided on the base body 71a.

The semiconductor circuit section 110 includes e.g. a semiconductor substrate 111 and a transistor 112.

The semiconductor substrate 111 includes a major surface 111a of the semiconductor substrate 111. The semiconductor substrate 111 includes an element region 111b provided on the major surface 111a. The transistor 112 is provided in the element region 111b.

The semiconductor circuit section 110 may include a processing circuit 113. The processing circuit 113 may be provided in the element region 111b or a different region. The processing circuit 113 is provided at an arbitrary location of the semiconductor circuit section 110. The processing circuit 113 may include the transistor 112 provided in the element region 111b.

The base body 71a is provided e.g. above the semiconductor circuit section 110. A cavity section 70 is formed in the base body 71a. The cavity section 70 is formed above the transistor 112. The cavity section 70 is formed at least above the element region 111b. The portion of the base body 71a other than the cavity section 70 is a non-cavity section 71. The non-cavity section 71 is juxtaposed with the cavity section 70 in the plane parallel to the major surface 111a.

In this example, the strain sensing element 50 is formed above the substrate on which the transistor 112 is formed. The transistor 112 and the strain sensing element 50 are connected not by a wire used in the mounting process, but by a wiring layer integrally formed in the wafer manufacturing process. This can downsize the pressure sensor. Thus, the strain can be sensed with high sensitivity in a small region.

The transistor 112 and the strain sensing element 50 are formed on the common substrate. Thus, a circuit (e.g., processing circuit 113) such as a calculation circuit, amplification circuit, and communication circuit for processing the information obtained in the sensor can be formed on the same substrate as the strain sensing element 50. The sensor with high sensitivity is formed integrally with the calculation circuit. Thus, the system viewed as a whole can be downsized. Furthermore, this can reduce the power consumption.

In this embodiment, for instance, a sensor with high sensitivity is used. Furthermore, the circuit for calculating the signal obtained in the sensor is realized as a system-on-chip on the common substrate.

However, as described above, the semiconductor circuit section 110 may be provided separately from the base body 71a and the sensor section 72. In this case, for instance, the base body 71a, the sensor section 72, and the semiconductor circuit section 110 are placed in one package in the packaging process.

Figure 25A:
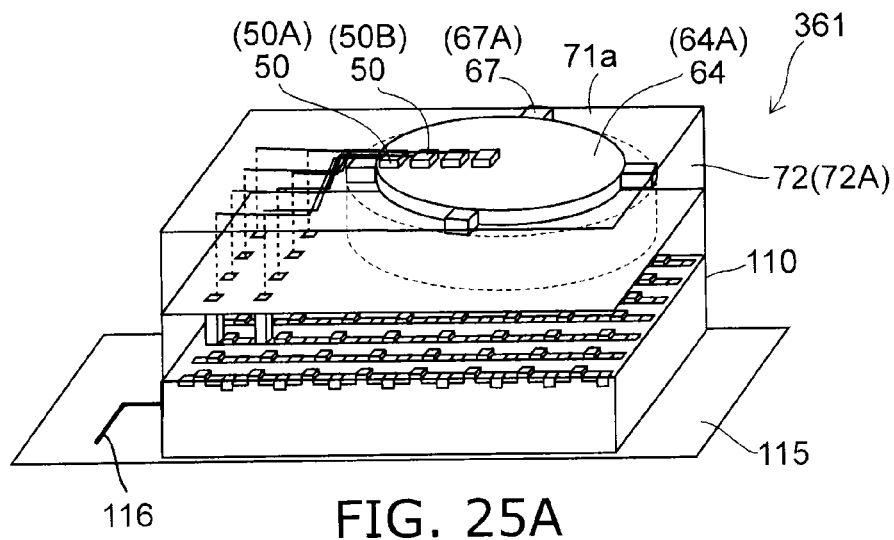
FIGS. 25A to 25C are schematic views illustrating the configuration of the pressure sensor according to the fourth embodiment.
Figure 25B:
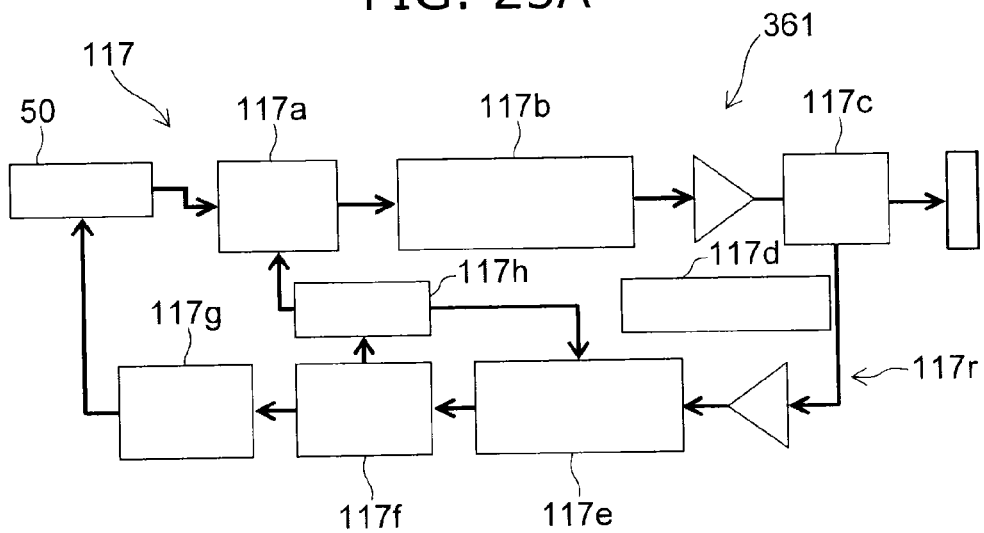
Figure 25C:
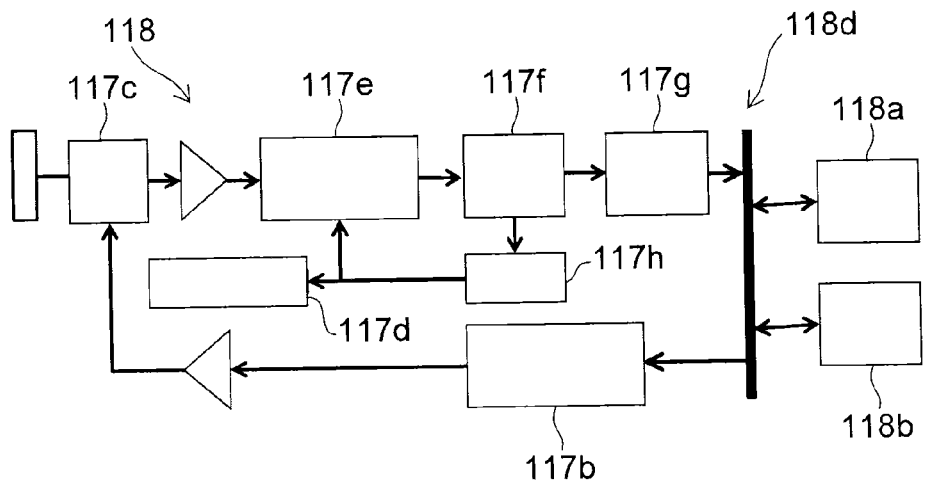

FIGS. 25A to 25C are schematic views illustrating the configuration of the pressure sensor according to the fourth embodiment.

FIG. 25A is a schematic perspective view. FIGS. 25B and 25C are block diagrams illustrating the pressure sensor.

As shown in FIG. 25A, the pressure sensor 361 according to this embodiment further includes an antenna 115 and an electrical wiring 116 in addition to the base body 71a, the sensor section 72, and the semiconductor circuit section 110. The antenna 115 is connected to the semiconductor circuit section 110 through the electrical wiring 116. The sensor section 72 of the pressure sensor 361 has a similar configuration to e.g. the sensor section 72 of the pressure sensor 310 illustrated in FIGS. 1 and 2. More specifically, the sensor section 72 includes e.g. a base body 71a and a first sensor section 72A. The first sensor section 72A includes a first transducing thin film 64, a first fixing part 67A, and a first strain sensing element 50A. In this example, the first sensor section 72A further includes a second strain sensing element 50B. The configuration of the foregoing is as described above.

As shown in FIG. 25B, the pressure sensor 361 includes a transmission circuit 117. The transmission circuit 117 wirelessly transmits data based on the electrical signal flowing in the strain sensing element 50. At least part of the transmission circuit 117 can be provided in the semiconductor circuit section 110. The semiconductor circuit section 110 can include a transmission circuit 117 for wirelessly transmitting data based on the electrical signal flowing in the strain sensing element 50.

As shown in FIG. 25C, the electronic equipment 118d used in combination with the pressure sensor 361 includes a reception section 118. The electronic equipment 118d is e.g. an electronic device such as a mobile terminal.

For instance, the pressure sensor 361 including the transmission circuit 117 is used in combination with the electronic equipment 118d including the reception section 118. This provides greater convenience.

In this example, as shown in FIG. 25B, the pressure sensor 361 includes a reception circuit 117r for receiving a control signal from the electronic equipment 118d. For instance, at least part of the reception circuit 117r can be provided in the semiconductor circuit section 110. As the result of providing the reception circuit 117r, for instance, the operation of the pressure sensor 361 can be controlled by manipulating the electronic equipment 118d.

As shown in FIG. 25B, in this example, the pressure sensor 361 includes e.g. an AD converter 117a and a Manchester encoding section 117b as the transmission circuit 117. The AD converter 117a is connected to the strain sensing element 50. The pressure sensor 361 further includes a switching section 117c for switching transmission and reception. This switching is controlled by a timing controller 117d. A data correction section 117e, a synchronization section 117f, and a decision section 117g are provided as the reception circuit 117r. Furthermore, a voltage controlled oscillator 117h (VCO) is provided.

On the other hand, as shown in FIG. 25C, the electronic equipment 118d includes a Manchester encoding section 117b, a switching section 117c, a timing controller 117d, a data correction section 117e, a synchronization section 117f, a decision section 117g, and a voltage controlled oscillator 117h. The electronic equipment 118d further includes a memory section 118a and a central processing unit 118b (CPU).

(Fifth Embodiment)

This embodiment relates to a method for manufacturing the pressure sensor according to the embodiment. In the following, a method for manufacturing the pressure sensor 360 is described as an example.

Figure 26:
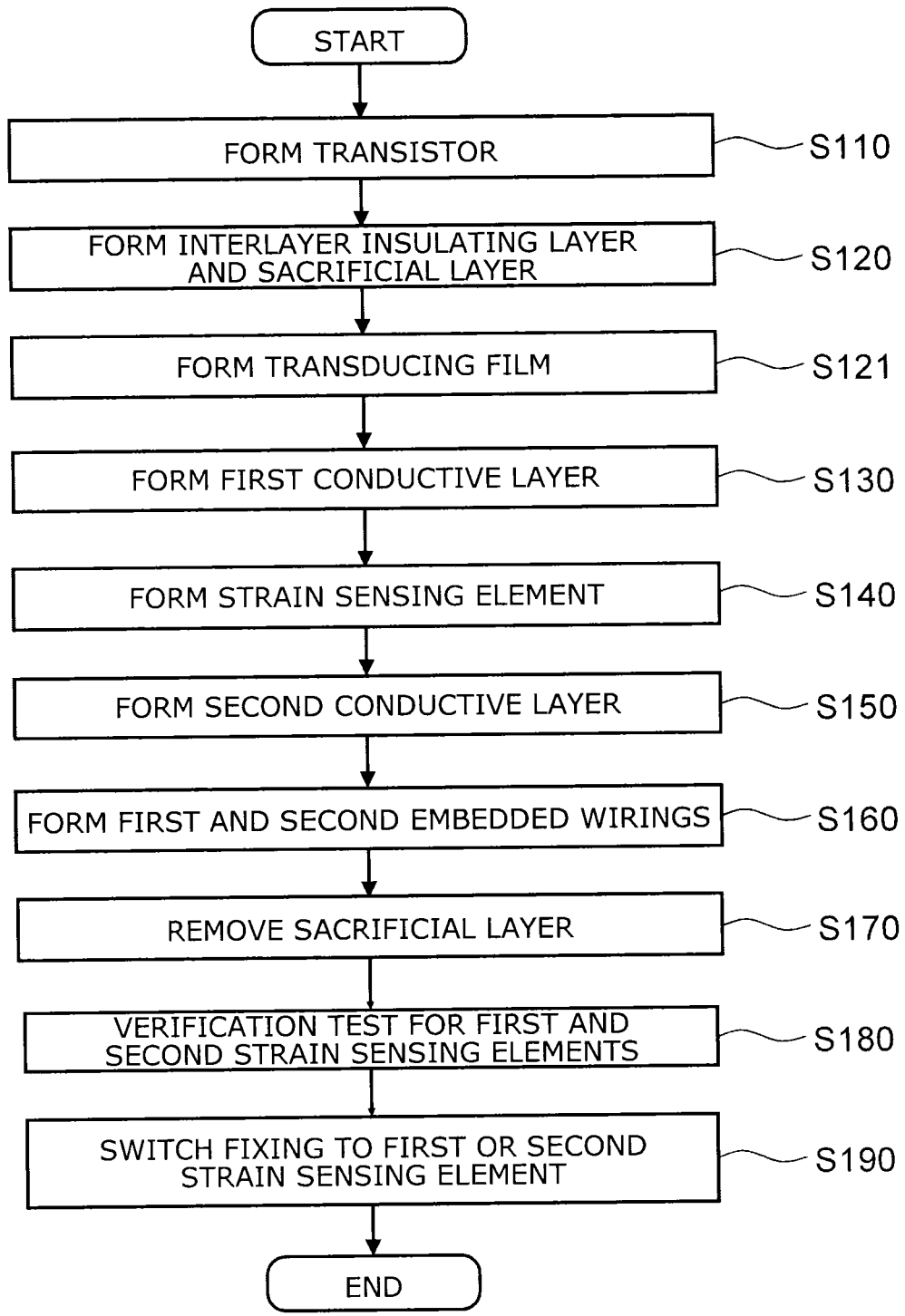
FIG. 26 is a flow chart illustrating the method for manufacturing a pressure sensor according to a fifth embodiment.

FIG. 26 is a flow chart illustrating the method for manufacturing a pressure sensor according to a fifth embodiment.

As shown in FIG. 26, in the method for manufacturing a pressure sensor according to this embodiment, a transistor 112 is formed on a semiconductor substrate 111 (step S110).

In this manufacturing method, an interlayer insulating layer 114i is formed on the semiconductor substrate 111. A sacrificial layer 114I is formed on the transistor 112 (step S120).

A film (e.g., transducing film 64fm) constituting a transducing thin film 64 is formed on the interlayer insulating film 114i and the sacrificial layer 114I (step S121). As the case may be, the following first conductive layer may double as a transducing thin film 64. In this case, step S121 is omitted.

Then, a first conductive layer (conductive layer 61f) constituting a first wiring layer 61 is formed (step S130).

A strain sensing element 50 including a first magnetic layer 10 is formed on the first conductive layer (conductive layer 61f) on the sacrificial layer 114I (step S140).

A second conductive layer (conductive layer 62f) constituting a second wiring layer 62 is formed on the strain sensing element 50 (step S150).

A first wiring 61c and a second wiring 62c are formed in the interlayer insulating layer (step S160). The first wiring 61c electrically connects the first conductive layer (conductive layer 61f) to the semiconductor substrate 111. The second wiring 62c electrically connects the second conductive layer (conductive layer 62f) to the semiconductor substrate 111. Step S160 is performed by a single or multiple steps of processing in e.g. at least one of the time during the aforementioned steps S110-S150 and the time after step S150.

Then, the sacrificial layer 114I is removed (step S170).

Then, a verification test for the first strain sensing element 50A and the second strain sensing element 50B is performed (step S180). For instance, the processing described with reference to FIGS. 20, 22A, and 22B is performed.

Then, the first strain sensing element 50A or the second strain sensing element 50B is selected and fixed (step S190). For instance, the processing described with reference to FIGS. 22A and 22B is performed.

The method for manufacturing a pressure sensor according to the embodiment can address more flexibly the variation in the performance of the transducing thin film 64 by adopting applicable strain sensing elements 50. This can improve the efficiency of manufacturing a pressure sensor. Furthermore, this embodiment can provide a method for manufacturing a pressure sensor having high sensitivity.

The aforementioned step of removing the sacrificial layer 114I (step S170) includes e.g. removing (e.g., etching) the sacrificial layer 114I from the upper surface of the sacrificial layer 114I (the surface of the sacrificial layer 114I on the opposite side from the semiconductor substrate 111).

(Sixth Embodiment)

Figure 27:
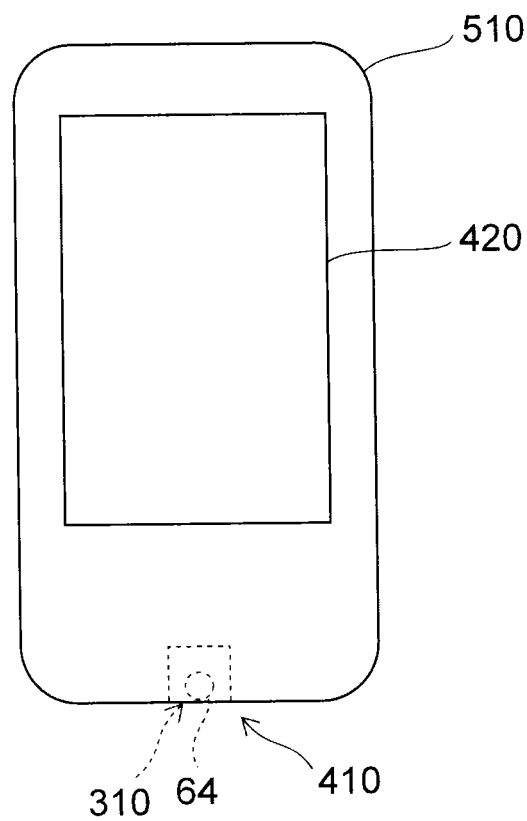
FIG. 27 is a schematic view illustrating the configuration of a microphone according to a sixth embodiment.

FIG. 27 is a schematic view illustrating the configuration of a microphone according to a sixth embodiment.

As shown in FIG. 27, the microphone 410 according to this embodiment includes an arbitrary pressure sensor according to the embodiments or a pressure sensor of the variations thereof. This example is based on the pressure sensor 310. The microphone 410 is incorporated in the end part of a personal digital assistant 510. The transducing thin film 64 in the pressure sensor 360 inside the microphone 410 is substantially parallel to e.g. the surface of the personal digital assistant 510 on which the display section 420 is provided. However, the embodiment is not limited thereto. The placement of the transducing thin film 64 is arbitrary.

According to this embodiment, the microphone 410 has high sensitivity for e.g. the pressure in a wide range from low sound volume to high sound volume. Accordingly, a microphone 410 having a wide dynamic range can be realized. Furthermore, the microphone 410 has high sensitivity in a wide range of frequencies.

The embodiments of the invention have been described above with reference to examples. However, the embodiments of the invention are not limited to these examples. For instance, any specific configurations of various components such as the base body, sensor section, transducing thin film, fixing part, strain sensing element, magnetic layer, intermediate layer, and processing circuit included in the pressure sensor and the microphone are encompassed within the scope of the invention as long as those skilled in the art can similarly practice the invention and achieve similar effects by suitably selecting such configurations from conventionally known ones.

Further, combinations of two or more components of the respective specific examples in a technically allowable range are also included in the scope of the invention in a range without departing from the spirit of the invention.

In addition, all pressure sensors and microphones obtainable by an appropriate design modification by those skilled in the art based on the pressure sensors and the microphones described above as the embodiments of the invention also are included in the scope of the invention in a range without departing from the spirit of the invention.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A pressure sensor comprising:
    a base body;
    a sensor section provided on the base body; and
    a processing circuit configured to process a signal obtained from the sensor section,
    the sensor section including:
        a flexible transducing thin film having a film surface;
        a first strain sensing element provided on the film surface at a position being different from barycenter of the film surface; and
        a second strain sensing element provided on the film surface at a position spaced from the first strain sensing element and being different from the barycenter, and
    the processing circuit being configured to output as an output signal at least one of a first signal obtained from the first strain sensing element upon application of external pressure to the transducing thin film and a second signal obtained from the second strain sensing element upon application of the external pressure to the transducing thin film,
    wherein
    the first strain sensing element is included in a first strain sensing element group in which a plurality of strain sensing elements are connected in series, and
    the second strain sensing element is included in a second strain sensing element group in which a plurality of strain sensing elements are connected in series, the second strain sensing element group being different from the first strain sensing element group.

2. The sensor according to claim 1, wherein distance between the first strain sensing element and the barycenter is different from distance between the second strain sensing element and the barycenter.

3. The sensor according to claim 1, wherein the first strain sensing element group and the second strain sensing element group are each placed on the transducing thin film having a circular shape or the transducing thin film having a rectangular shape.

4. The sensor according to claim 1, wherein distance between the first strain sensing element group and the barycenter is different from distance between the second strain sensing element group and the barycenter.

5. The sensor according to claim 4, wherein
    the first strain sensing element group includes a first line in which a plurality of strain sensing elements are connected in series, and a second line in which a plurality of strain sensing elements are connected in series, the second line being provided at a position symmetric to the first line with respect to the barycenter,
    the second strain sensing element group includes a third line in which a plurality of strain sensing elements are connected in series, and a fourth line in which a plurality of strain sensing elements are connected in series, the fourth line being provided at a position symmetric to the third line with respect to the barycenter,
    the first line is electrically connected in series or parallel to the second line, and
    the third line is electrically connected in series or parallel to the fourth line.

6. The sensor according to claim 4, wherein
    the first strain sensing element group includes a first line in which a plurality of strain sensing elements are connected in series, and a second line in which a plurality of strain sensing elements are connected in series, the second line being provided at a position symmetric to the first line with respect to the barycenter,
    the second strain sensing element group includes a third line in which a plurality of strain sensing elements are connected in series, and a fourth line in which a plurality of strain sensing elements are connected in series, the fourth line being provided at a position symmetric to the third line with respect to the barycenter,
    the first line and the second line form a first bridge circuit, and
    the third line and the fourth line form a second bridge circuit different from the first bridge circuit.

7. The sensor according to claim 5, wherein
a control signal for selecting the first strain sensing element group is generated when an output signal of the first strain sensing element group is not larger than a first threshold, and
a control signal for selecting the second strain sensing element group is generated when the output signal is larger than the first threshold.

8. The sensor according to claim 1, wherein the first strain sensing element and the second strain sensing element each include a first magnetic layer, a second magnetic layer, and a nonmagnetic intermediate layer provided between the first magnetic layer and the second magnetic layer.

9. The sensor according to claim 1, wherein
the sensor section further includes a third strain sensing element provided on the film surface at a position spaced from the first strain sensing element and the second strain sensing element and being different from the barycenter, and
the processing circuit is configured to output as an output signal at least one of the first signal obtained from the first strain sensing element upon application of the external pressure to the transducing thin film, the second signal obtained from the second strain sensing element upon application of the external pressure to the transducing thin film, and a third signal obtained from the third strain sensing element upon application of the external pressure to the transducing thin film,
the third strain sensing element is included in a third strain sensing element group in which a plurality of strain sensing elements are connected in series, the third strain sensing element group being different from the first strain sensing element group and the second strain sensing element group,
the first strain sensing element group includes a first line in which a plurality of strain sensing elements are connected in series, and a second line in which a plurality of strain sensing elements are connected in series, the second line being provided at a position symmetric to the first line with respect to the barycenter,
the second strain sensing element group includes a third line in which a plurality of strain sensing elements are connected in series, and a fourth line in which a plurality of strain sensing elements are connected in series, the fourth line being provided at a position symmetric to the third line with respect to the barycenter,
the third strain sensing element group includes a fifth line in which a plurality of strain sensing elements are connected in series, and a sixth line in which a plurality of strain sensing elements are connected in series, the sixth line being provided at a position symmetric to the fifth line with respect to the barycenter,
the first line is electrically connected in series or parallel to the second line,
the third line is electrically connected in series or parallel to the fourth line, and
the fifth line is electrically connected in series or parallel to the sixth line.

10. The sensor according to claim 9, wherein
a control signal for selecting the first strain sensing element group is generated when an output signal of the first strain sensing element group is not larger than a first threshold,
a control signal for selecting the second strain sensing element group is generated when the output signal of the first strain sensing element group is larger than the first threshold and an output signal of the second strain sensing element group is not larger than a second threshold, and
a control signal for selecting the third strain sensing element group is generated when the output signal of the first strain sensing element group is larger than the first threshold and the output signal of the second strain sensing element group is larger than the second threshold.

11. The sensor according to claim 1, wherein
the sensor section further includes a third strain sensing element provided on the film surface at a position spaced from the first strain sensing element and the second strain sensing element and being different from the barycenter, and
the processing circuit is configured to output as an output signal at least one of the first signal obtained from the first strain sensing element upon application of the external pressure to the transducing thin film, the second signal obtained from the second strain sensing element upon application of the external pressure to the transducing thin film, and a third signal obtained from the third strain sensing element upon application of the external pressure to the transducing thin film,
the third strain sensing element is included in a third strain sensing element group in which a plurality of strain sensing elements are connected in series, the third strain sensing element group being different from the first strain sensing element group and the second strain sensing element group,
the first strain sensing element group includes a first line in which a plurality of strain sensing elements are connected in series, and a second line in which a plurality of strain sensing elements are connected in series, the second line being provided at a position symmetric to the first line with respect to the barycenter,
the second strain sensing element group includes a third line in which a plurality of strain sensing elements are connected in series, and a fourth line in which a plurality of strain sensing elements are connected in series, the fourth line being provided at a position symmetric to the third line with respect to the barycenter,
the third strain sensing element group includes a fifth line in which a plurality of strain sensing elements are connected in series, and a sixth line in which a plurality of strain sensing elements are connected in series, the sixth line being provided at a position symmetric to the fifth line with respect to the barycenter,
the first line and the second line form a first bridge circuit,
the third line and the fourth line form a second bridge circuit different from the first bridge circuit, and
the fifth line and the sixth line form a third bridge circuit different from the first bridge circuit and the second bridge circuit.

12. A microphone comprising the pressure sensor according to claim 1.

13. A pressure sensor comprising:
a base body;
a sensor section provided on the base body; and
a processing circuit configured to process a signal obtained from the sensor section, the sensor section including:
- a flexible transducing thin film having a film surface;
- a first strain sensing element provided on the film surface at a position being different from barycenter of the film surface; and
- a second strain sensing element provided on the film surface at a position spaced from the first strain sensing element and being different from the barycenter, and the processing circuit being configured to output as an output signal at least one of a first signal obtained from the first strain sensing element upon application of external pressure to the transducing thin film and a second signal obtained from the second strain sensing element upon application of the external pressure to the transducing thin film, wherein the processing circuit outputs the second signal as an output signal when the first signal is larger than a prescribed threshold, and outputs the first signal as an output signal when the first signal is not larger than the prescribed threshold.

14. A pressure sensor comprising:
a base body; and
a sensor section provided on the base body,
the sensor section including:
- a flexible transducing thin film having a film surface;
- a first strain sensing element provided on the film surface at a position being different from barycenter of the film surface; and
- a second strain sensing element provided on the film surface at a position spaced from the first strain sensing element and being different from the barycenter, and the pressure sensor including an electrical wiring configured to output as an output signal only one of a first signal obtained from the first strain sensing element upon application of external pressure to the transducing thin film and a second signal obtained from the second strain sensing element upon application of the external pressure to the transducing thin film, wherein
the first strain sensing element is included in a first strain sensing element group in which a plurality of strain sensing elements are connected in series, and
the second strain sensing element is included in a second strain sensing element group in which a plurality of strain sensing elements are connected in series, the second strain sensing element group being different from the first strain sensing element group.

15. The sensor according to claim 14, wherein the electrical wiring includes an electrical switch configured to output only one of the first signal and the second signal as the output signal.

16. The sensor according to claim 14, wherein the electrical wiring includes a broken portion and is configured to output only one of the first signal and the second signal as the output signal.

17. The sensor according to claim 14, wherein
the sensor section further includes a third strain sensing element provided on the film surface at a position spaced from the first strain sensing element and the second strain sensing element and being different from the barycenter, and
the electrical wiring is configured to output as an output signal at least one of the first signal obtained from the first strain sensing element upon application of the external pressure to the transducing thin film, the second signal obtained from the second strain sensing element upon application of the external pressure to the transducing thin film, and a third signal obtained from the third strain sensing element upon application of the external pressure to the transducing thin film.

18. An acoustic processing system comprising a plurality of the pressure sensors according to claim 14, wherein
the plurality of the pressure sensors are connected to each other by an electrical wiring and configured to perform signal processing.

* * * * *